(12) United States Patent
Sadeghi et al.

(10) Patent No.: US 11,368,946 B2
(45) Date of Patent: Jun. 21, 2022

(54) CHANNELIZATION OF VEHICLE-TO-EVERYTHING (V2X) NETWORKS

(71) Applicant: Intel Corporation, Santa Clara, CA (US)

(72) Inventors: Bahareh Sadeghi, Portland, OR (US); Thomas J. Kenney, Portland, OR (US); Ehud Reshef, Kiryat Tivon (IL); Dave A. Cavalcanti, Portland, OR (US); Laurent Cariou, Portland, OR (US); Mohammad Mamunur Rashid, Hillsboro, OR (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 16/653,468

(22) Filed: Oct. 15, 2019

(65) Prior Publication Data

US 2020/0053706 A1 Feb. 13, 2020

Related U.S. Application Data

(60) Provisional application No. 62/769,686, filed on Nov. 20, 2018, provisional application No. 62/745,651, filed on Oct. 15, 2018.

(51) Int. Cl.
*H04W 72/04* (2009.01)
*H04W 4/40* (2018.01)
(Continued)

(52) U.S. Cl.
CPC .......... *H04W 72/042* (2013.01); *H04W 4/40* (2018.02); *H04W 72/005* (2013.01);
(Continued)

(58) Field of Classification Search
CPC ... H04W 72/042; H04W 4/40; H04W 74/006; H04W 74/08; H04W 72/0486; H04W 72/005; H04W 72/044; H04W 88/08
See application file for complete search history.

(56) References Cited

U.S. PATENT DOCUMENTS 10,091,822 B2 * 10/2018 Huang .............. H04W 74/0833
2016/0183305 A1 * 6/2016 Huang .............. H04W 74/0833
370/329

(Continued)

*Primary Examiner* — Hassan Kizou
*Assistant Examiner* — Abdullahi Ahmed
(74) *Attorney, Agent, or Firm* — Schwegman Lundberg & Woessner, P.A.

(57) ABSTRACT

Methods, apparatuses, and computer readable media for channelization of vehicle-to-everything (V2X) networks in a wireless network are disclosed. An apparatus of an of a next generation vehicle to everything (V2X) (NGV) wireless device includes processing circuitry configured to: encode a management frame, the management frame including an indication of resource units (RUs) for use by NGV stations during transmission opportunities (TXOPs) where the RUs part of a channel. The processing circuitry is further configured to configure the NGV wireless device to transmit the management frame on the channel and configure the NGV wireless device to transmit a short sequence frame (SF) at a start of each TXOP of the TXOPs. An apparatus for V2X networks is disclosed that is configured to transmit a packet in center tones of a channel and to simultaneously transmit parity or redundancy information for the packet on tones on either side of the center tones.

20 Claims, 15 Drawing Sheets

(51) Int. Cl.
    *H04W 74/00*     (2009.01)
    *H04W 74/08*     (2009.01)
    *H04W 72/00*     (2009.01)
    H04W 88/08     (2009.01)
    H04W 84/12     (2009.01)

(52) U.S. Cl.
    CPC ..... *H04W 72/044* (2013.01); *H04W 72/0486* (2013.01); *H04W 74/006* (2013.01); *H04W 74/08* (2013.01); *H04W 84/12* (2013.01); *H04W 88/08* (2013.01)

(56) References Cited

U.S. PATENT DOCUMENTS

| | | | |
|---|---|---|---|
| 2017/0257887 A1* | 9/2017 | Ghosh | H04W 72/0453 |
| 2018/0152819 A1* | 5/2018 | Pinheiro | H04W 4/80 |
| 2019/0261352 A1* | 8/2019 | Cariou | H04L 27/2602 |
| 2019/0297579 A1* | 9/2019 | Bhattad | H04W 16/14 |
| 2020/0029350 A1* | 1/2020 | Asterjadhi | H04W 28/18 |

* cited by examiner

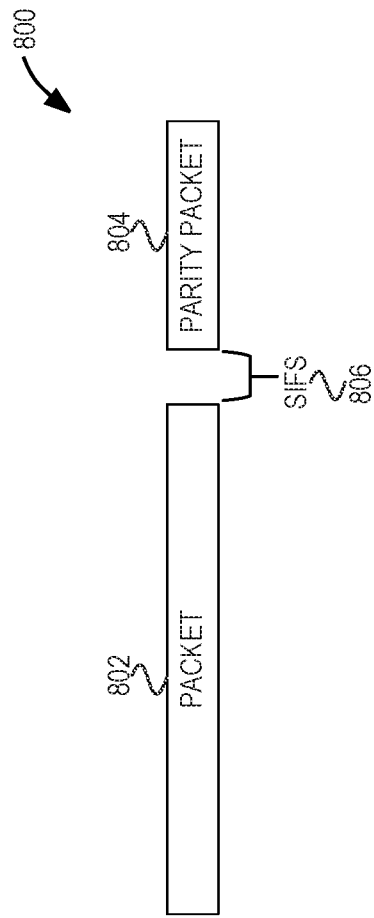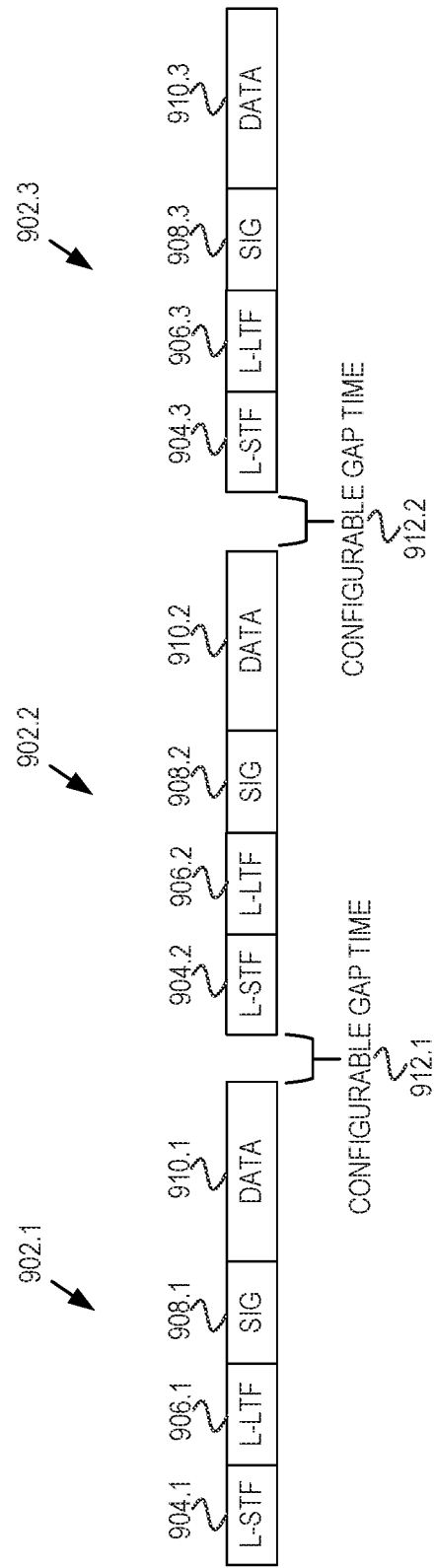

CHANNELIZATION OF VEHICLE-TO-EVERYTHING (V2X) NETWORKS

PRIORITY CLAIM

This application claims the benefit of priority under 35 USC 119(e) to U.S. Provisional Patent Application Ser. No. 62/745,651, filed Oct. 15, 2018, and 62/769,686, filed Nov. 20, 2018, which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to orthogonal frequency division multiple access (OFDMA) channelization of vehicle-to everything (V2X) networks. Some embodiments relate to improving data payload reception reliability in V2X networks.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 8 illustrates a packet being transmitted with a parity packet, in accordance with some embodiments.

FIGS. 9A and 9B illustrate a packet with repetitions of the packet 902, in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
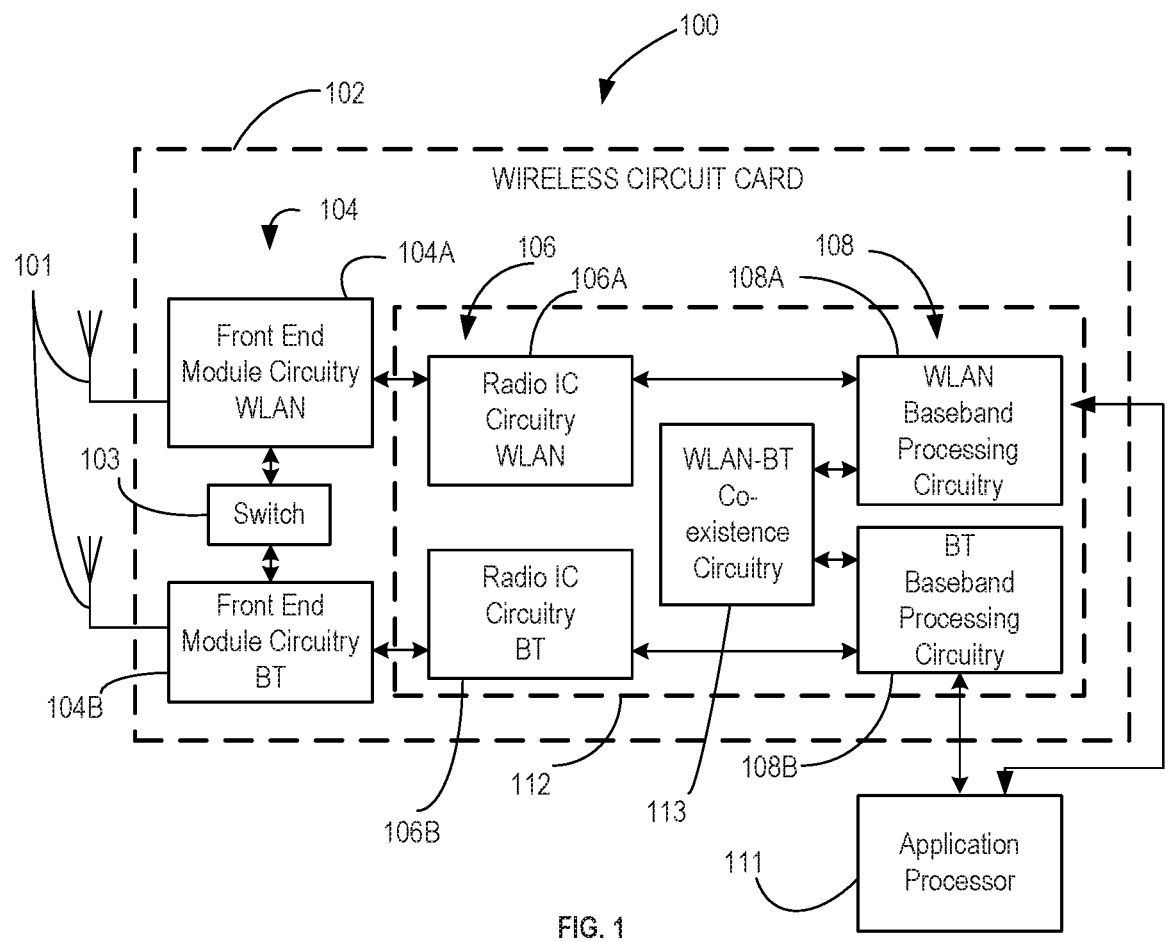
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
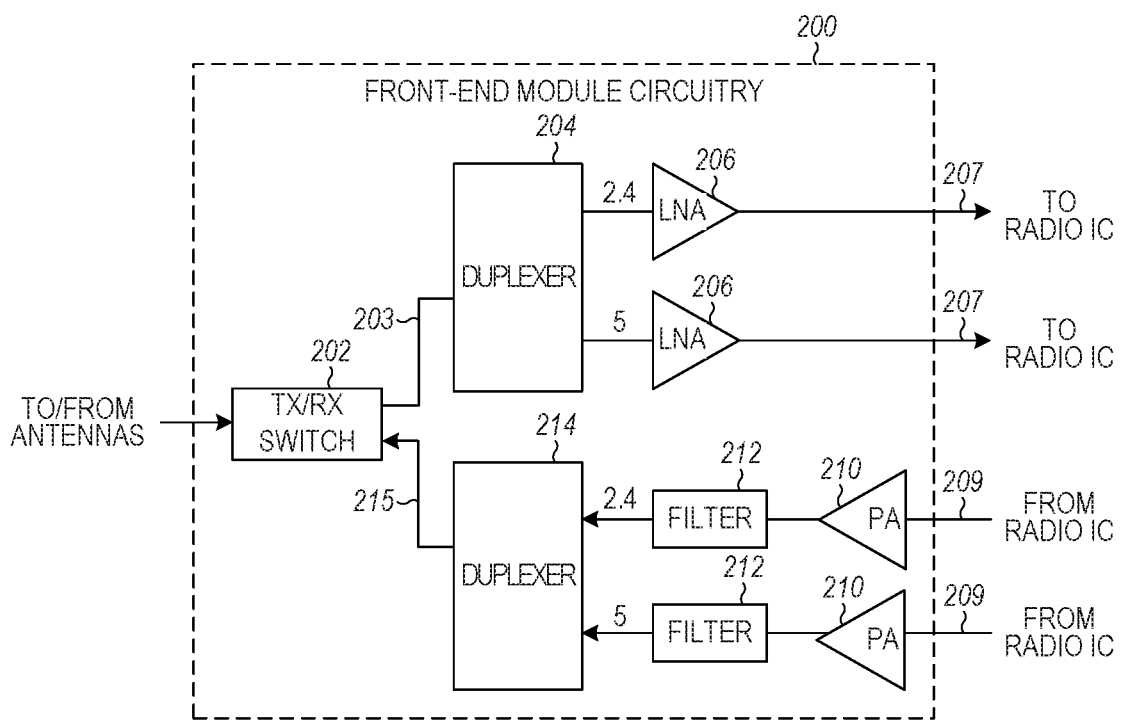
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
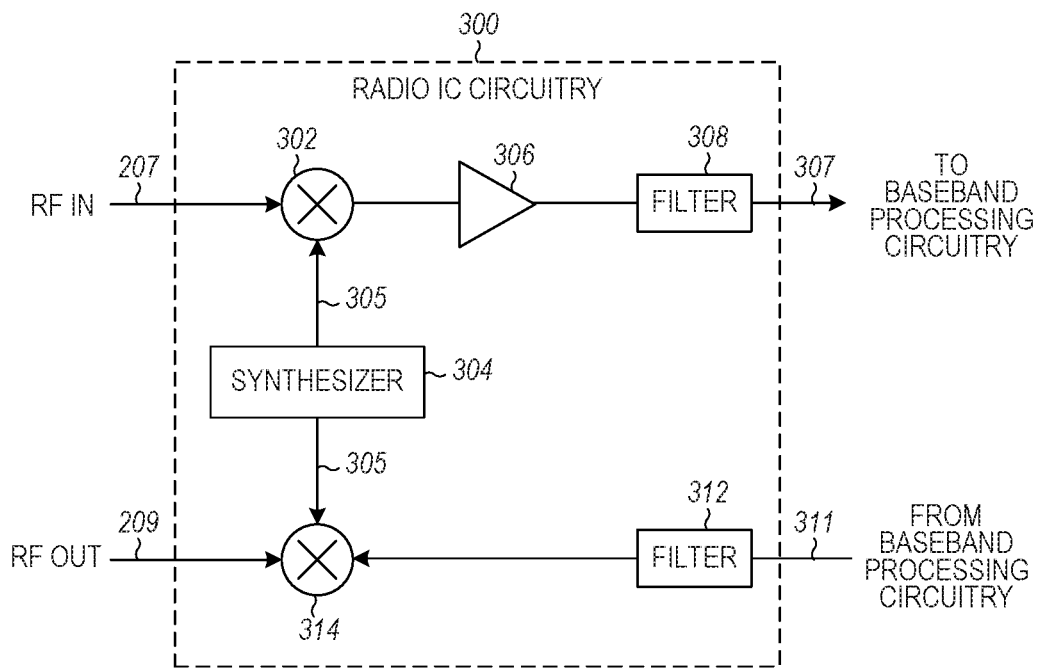
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
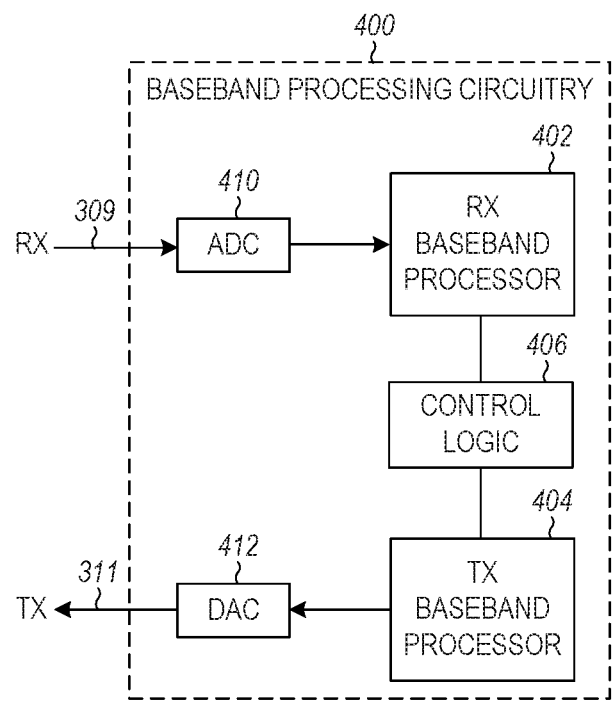
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
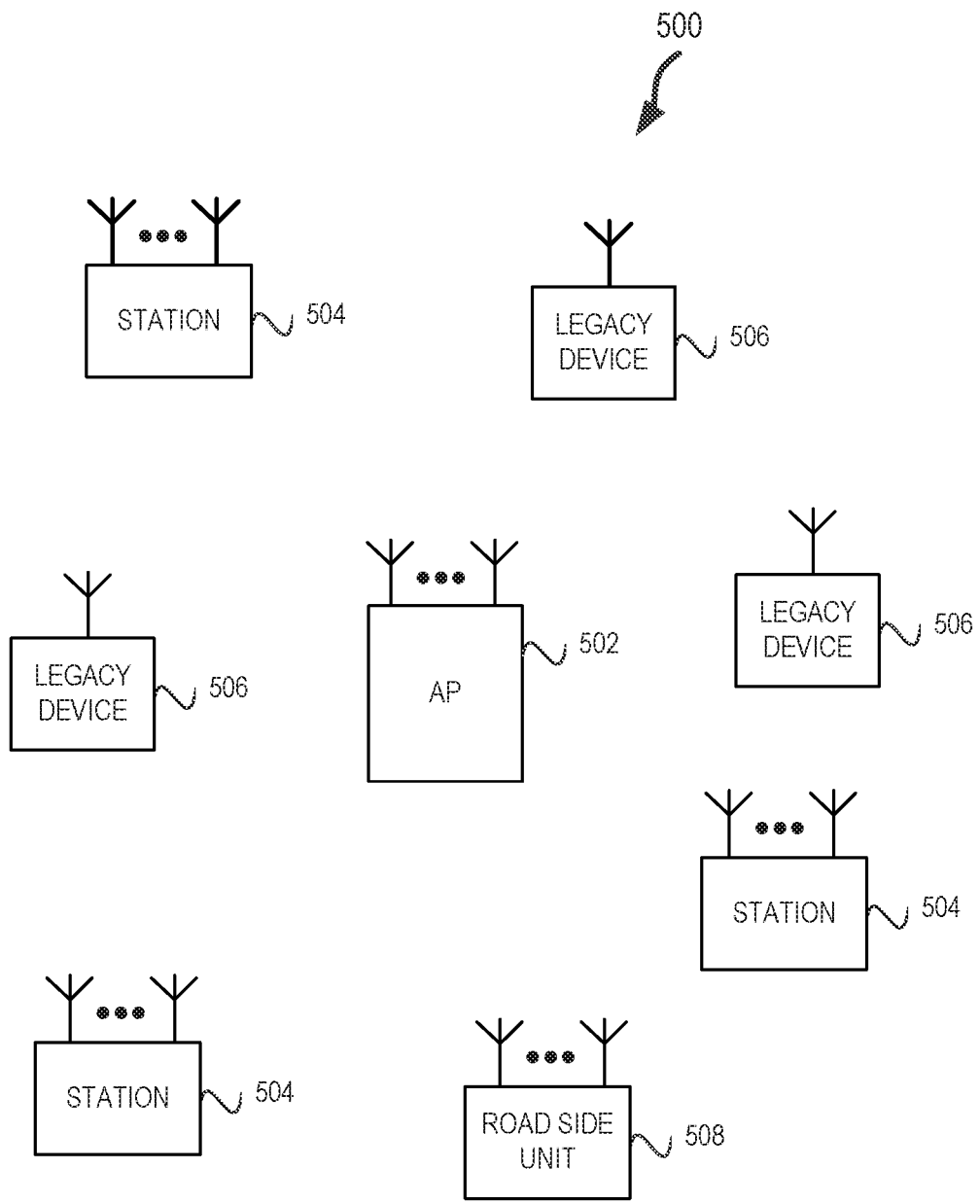
FIG. 5 illustrates wireless devices in accordance with some embodiments.

FIG. 5 illustrates wireless devices 500 in accordance with some embodiments. Illustrated in FIG. 5 is AP 502, stations 504, legacy devices 506, and roadside units (RSU) 508. In some embodiments, the AP 502, stations 504, legacy devices 506, and roadside units (RSU) 508 may be configured to operate on a Dedicated Short-range Communications (DSRC) band, which is 5.9 GHz (5.85 through 5.925 GHz). The communication may be categorized as vehicle (V) to V (V2V), V to pedestrian (P) (V2P), V to infrastructure (V2I), or V to network (N) (V2N), all of which may be represented by V to everything (V2X). Wireless Access in Vehicular Environments (WAVE) protocols operate using IEEE 802.11p and enable different vehicle services. In some embodiments, the stations 504 and RSU 508 are not associated with an AP 502. The communication is performed without being associated with an AP 502, in accordance with some embodiments. In some embodiments, the station 504 may be a lead vehicle, e.g., a station 504 that takes the lead in communication. In some embodiments, the AP 502, stations 504, and/or roadside units 508 are in communication with a cellular network and/or a management entity.

Legacy devices 506 operate in accordance with IEEE 802.11p, in accordance with some embodiments. Stations 504, AP 506, and/or RSUs 508 operate in accordance with IEEE 802.11ad, which may also be termed NGV (and NGV may be termed IEEE 802.11ad), in accordance with some embodiments. Legacy devices 506 operate in accordance with IEEE 802.11ax, in accordance with some embodiments. Stations 504, AP 506, and/or RSUs 508 operate in accordance with IEEE 802.11 next generation vehicle to everything (V2X) (NGV) and IEEE 802.11ax/extremely high throughput (EHT), in accordance with some embodiments.

In some embodiments, the AP 502 may form a wireless local area network (WLAN). The WLAN may comprise a basis service set (BSS) that may include a HE access point (AP) 502, which may be termed an AP, a plurality of stations 504, a plurality of legacy (e.g., IEEE 802.11g/n/ac/p) devices 506, and a plurality of roadside units 508. In some embodiments, the AP 502, stations 504, and roadside units 508 are configured to operate in accordance with IEEE 802.11 extremely high throughput (EHT) and IEEE 802.11ad.

In some embodiments, the AP 502, stations 504, and roadside units 508 are configured to operate in accordance with one or more additional communication standards, e.g., IEEE 802.11az/ad/ay, and/or a 3GPP standard. In some embodiments, the HE STAs 504 and/or HE AP 520 are configured to operate in accordance with IEEE 802.11az.

In some embodiments, IEEE 802.11EHT may be termed Next Generation 802.11. In some embodiments, the AP 502 may be configured to operate a HE BSS, ER BSS, and/or a BSS. Legacy devices may not be able to operate in the HE BSS and beacon frames in the HE BSS may be transmitted using HE PPDU's. An ER BSS may use ER PPDUs to transmit the beacon frames and legacy devices 504 may not be able to decode the beacon frames and thus are not able to operate in a ER BSS. The BSSs, e.g., BSS, ER BSS, and HE BSS, may used different BSSIDs.

The AP 502 may be an AP configured to operate in accordance with IEEE 802.11 to transmit and receive. The AP 502 may be a base station. The AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. In some embodiments, IEEE 802.11 EHT is termed IEEE 802.11be. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. AP 502 may be connected to the internet.

The AP 502, stations 504, legacy devices 506, and/or roadside units 508 may operate in accordance with one or more of IEEE 802.11 a/b/g/n/ac/ad/af/ah/aj/ay/p, or another legacy wireless communication standard. In some embodiments, the multiple-access technique used during the transmission opportunities (TXOPs) may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA). The AP 502, stations 504, legacy devices 506, and/or roadside units 508 may communicate with one another in accordance with legacy IEEE 802.11 communication techniques.

In some embodiments the station 504 may be a "group owner" (GO) for peer-to-peer modes of operation. A wireless device may be a station 502, an AP 502, a roadside unit 508, and/or a legacy device 506. In example embodiments, the stations 504, AP 502, roadside units 508, an apparatus of the stations 504, an apparatus of the AP 502, and/or an apparatus of the roadside units 508 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-21.

In example embodiments, the station 504, the AP 502, the roadside unit 508 are configured to perform the methods and operations/functions described herein in conjunction with FIGS. 1-21. In example embodiments, an apparatus of the station 504, an apparatus of the AP 502, and/or an apparatus of the roadside unit 508 are configured to perform the methods and functions described herein in conjunction with FIGS. 1-21. The term Wi-Fi may refer to one or more of the IEEE 802.11 communication standards. AP 502, STA 504, and roadside unit 508 may refer to NGV/EHT/HE AP and/or NGV/EHT/HE.

In some embodiments, an AP 502 and/or station 504 may be termed a lead vehicle. An AP 502 and/or station 504 may be referred to as a vehicle. In some embodiments, an AP 502, station 504, and/or roadside unit 508 may operate on a 2.4, 5 GHz and/or 6 GHz band, and may operate with different communication standards on the different bands.

Figure 6:
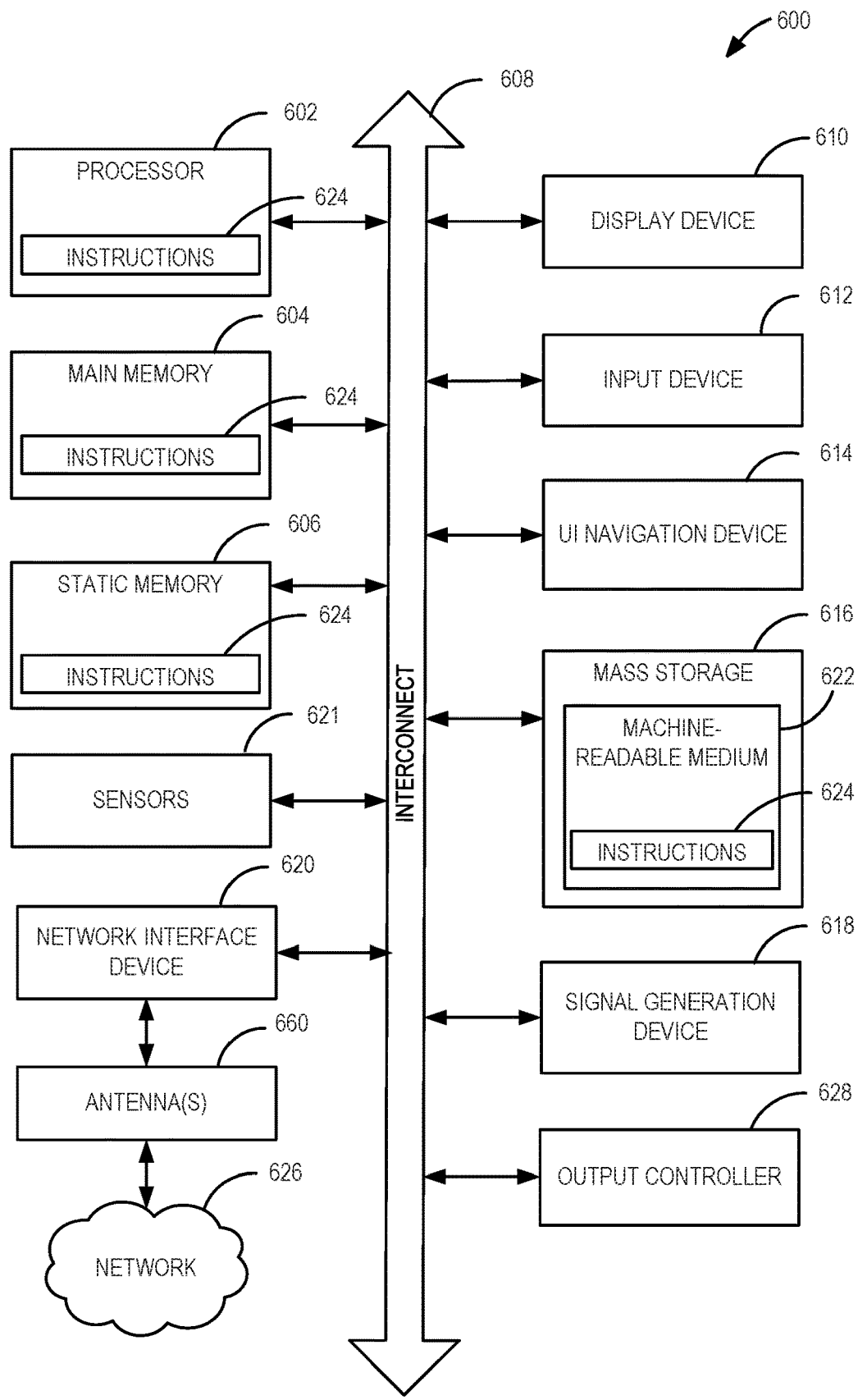
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
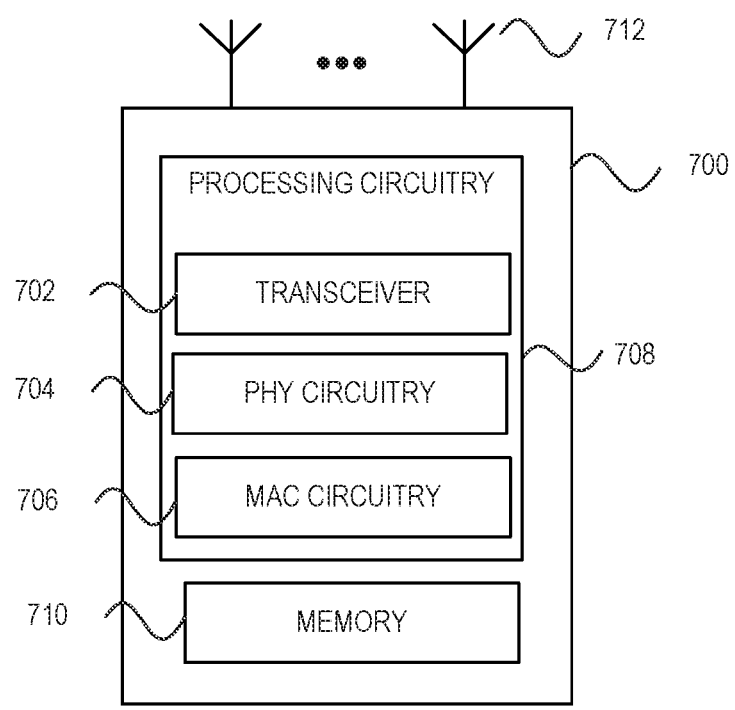
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, AP 502, and/or a HE STA or HE AP. A HE STA 504, AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described here in that refer to the wireless device 700 may be applicable to an apparatus for a wireless device 700 (e.g., AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 9B:
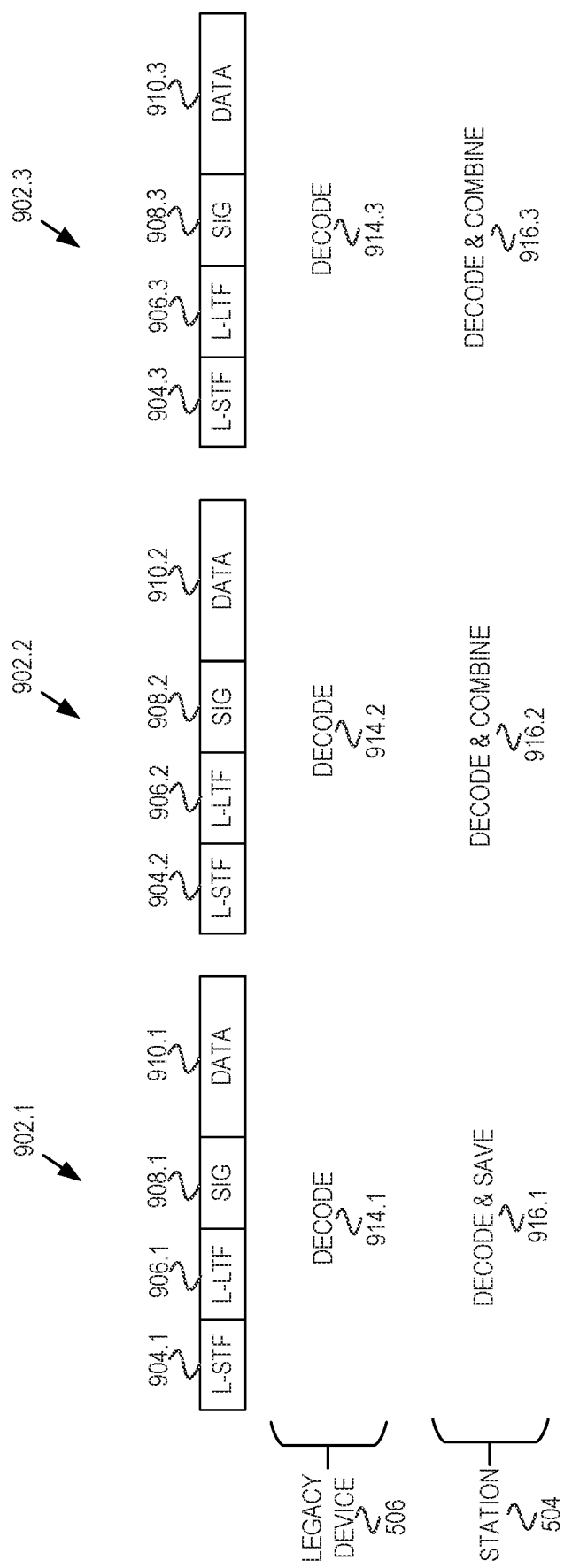

FIG. 8 illustrates a packet 802 being transmitted with a parity packet 804, in accordance with some embodiments. Illustrated in FIG. 8 is packet 802, parity packet 804, and short interframe space (SIFS) 806. Packet 802 is encoded in accordance with IEEE 802.11p, in accordance with some embodiments. Parity packet 804 is transmitted a SIFS 806 after the packet 802, in accordance with some embodiments. Parity packet 804 comprises parity information and/or an error correcting code for packet 802 and, in some embodiments, parity packet 804. Legacy devices 806 may defer during the parity packet 804 and may not be able to use the information in the parity packet 804 to improve the reliability of receiving packet 802. Stations 804, APs 802, and/or RSUs 808 are configured to decode both the packet 802 and use the parity packet 804 to perform error checking and/or error correction on the packet 802. In some embodiments, the information contained in the parity packet 804 is transmitted in OFDM symbols after packet 802. The parity packet 804 enables greater reliability for transmitting packet 802 between IEEE 802.11EVM wireless devices (e.g., stations 804, APs 802, and/or RSUs 808). The parity packet 804 may be backwards compatible with IEEE 802.11p devices (e.g., legacy devices 806) as the legacy devices 806 may defer during the transmission of the parity packet 804. In some embodiments, the packet 802 and the parity packet 804 are a media access control (MAC) protocol data unit (MPDUs) that are contained in a same physical protocol data unit (PPDU.) In some embodiments, legacy devices 806 decode the packet 802 and the parity packet 804, but do not know how to interpret the parity packet 804. Packet 802 may be the same or similar as packet 902 (FIG. 9A). In some embodiments, legacy devices 806 may have FIGS. 9A and 9B illustrate a packet 902 with repetitions of the packet 902, in accordance with some embodiments. Illustrated in FIG. 9A is packet 902.1, packet 902.2, and packet 902.3, and configurable gap time 912. The packet 902 comprises legacy short training field (L-STF) 904, legacy long-training field (L-LTF) 906, signal (SIG) field 908, and data field 910. The L-STF 904 and L-LTF 906 are signal training fields. The SIG 908 indicates encoding information of the data 910 such as a modulation and coding scheme (MCS) and duration or length of the packet 902 and/or data field 910. The data field 910 includes data to be transmitted. The configurable gap time 912 indicates a time between the transmission of the packets 902.1, which may be variable, e.g., a SIFS, a distributed inter-frame space (DIFS), extended inter-frame space (EIFS), or another time.

The packet 902.1 is transmitted by an IEEE 802.11ad wireless device (e.g., AP 502, station 504, and/or RSU 508.) IEEE 802.11ad wireless device waits a configurable gap time 912.1 and then transmits packet 902.2. IEEE 802.11ad wireless device waits a configurable gap time 912.2 and transmits packet 902.3. The pattern may be only once (i.e., only packet 902.2 is transmitted) or additional packets 902 may be transmitted after additional configurable gap times 912.

Illustrated in FIG. 9B is packet 902.1, packet 902.2, and packet 902.3, legacy device 506, and STA 504. Packet 902.1, packet 902.2, and packet 902.3 may be the same or similar as packet 902.1, packet 902.2, and packet 902.3, respectively. Packets 902.1, packet 902.2, and packet 902.3 may be transmitted with the configurable gap time 912.1 between them. Legacy device 506 will interpret the packets 902 as follows. Legacy device 506 (e.g., configured to operate in accordance with IEEE 802.11p) decodes 914.1, 914.2, 914.3, packets 902.1, 902.2, 902.3, respectively, as stand-alone packets. Legacy device 506 not know how to interpret receiving the same packet 902 three times.

STA 504 (e.g., configured to operate in accordance with IEEE 802.11ad) decodes and saves 916.1 packet 902.1. For example, STA 504 may save decoding information in accumulators for the received signals. STA 504 may then decode and combine 916.2 packet 902.2. For example, STA 504 may combine information about the received signals of packet 902.2 with the saved information regarding the received signals of packet 902.1. STA 504 may decode and combine 916.3 packet 902.3. For example, STA 504 may combine information about the received signals of packet 902.3 with the saved information regarding the received signals of packets 902.1, 902.2. STA 504 may then complete the decoding of packets 902.1,902.2, and 902.3. Combining the signals of the three packets 902 enables STA 504 to more reliably decode packet 902.1.

In some embodiments, station 504, AP 502, and/or RSU 508 may have difficulty determining which packets 900 to combine if one or more of the packets 902.1, 902.2, 902.3 is not decoded. In some embodiments, packets 902.1, 902.2, 902.3 may include one or more fields to indicate which packets 902 to combine, e.g., an indication in the data field 910 regarding a MAC sequence number and a number of packets.

Figure 10:
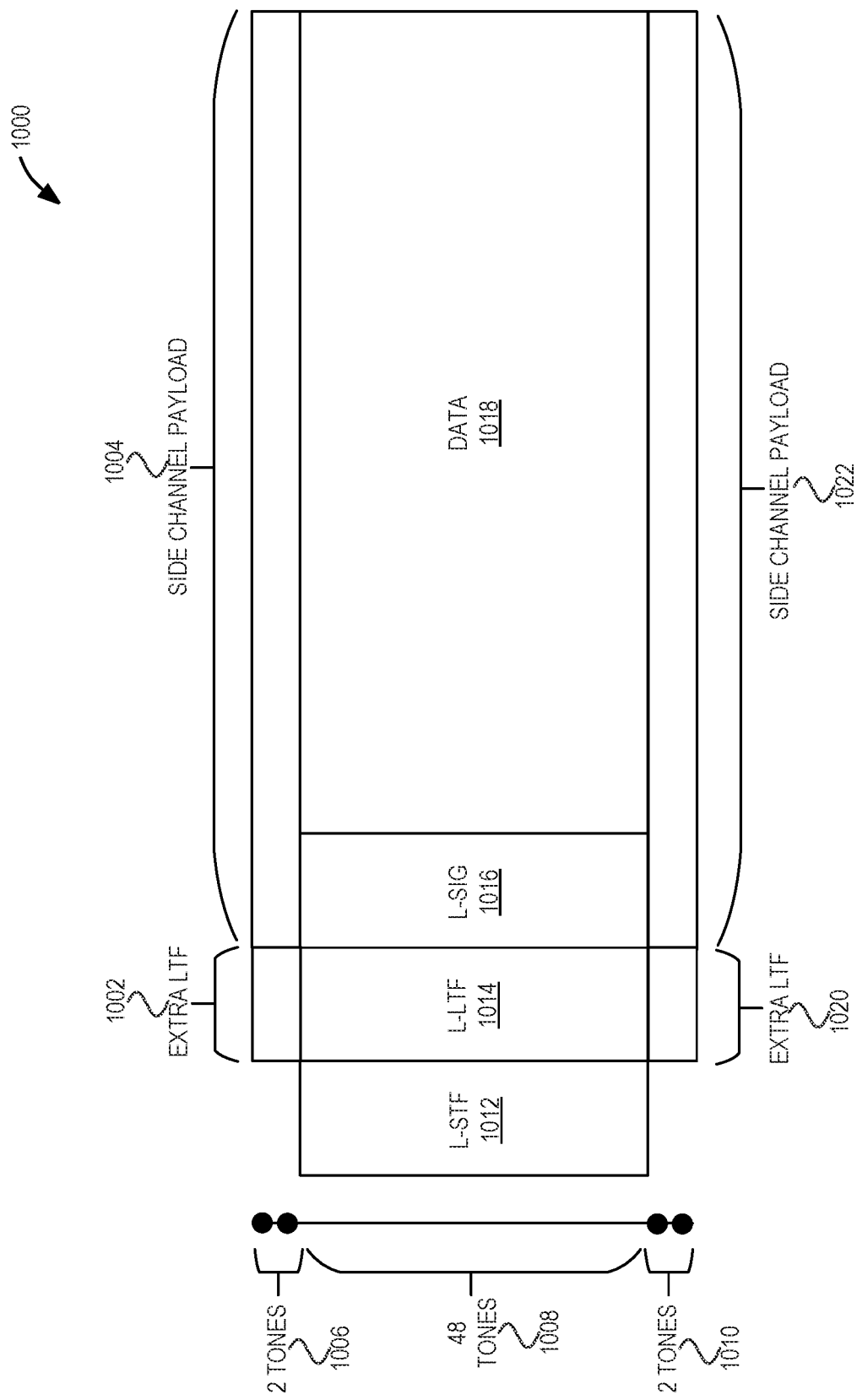
FIG. 10 illustrates a NGV packet, in accordance with some embodiments.
Figure 11:
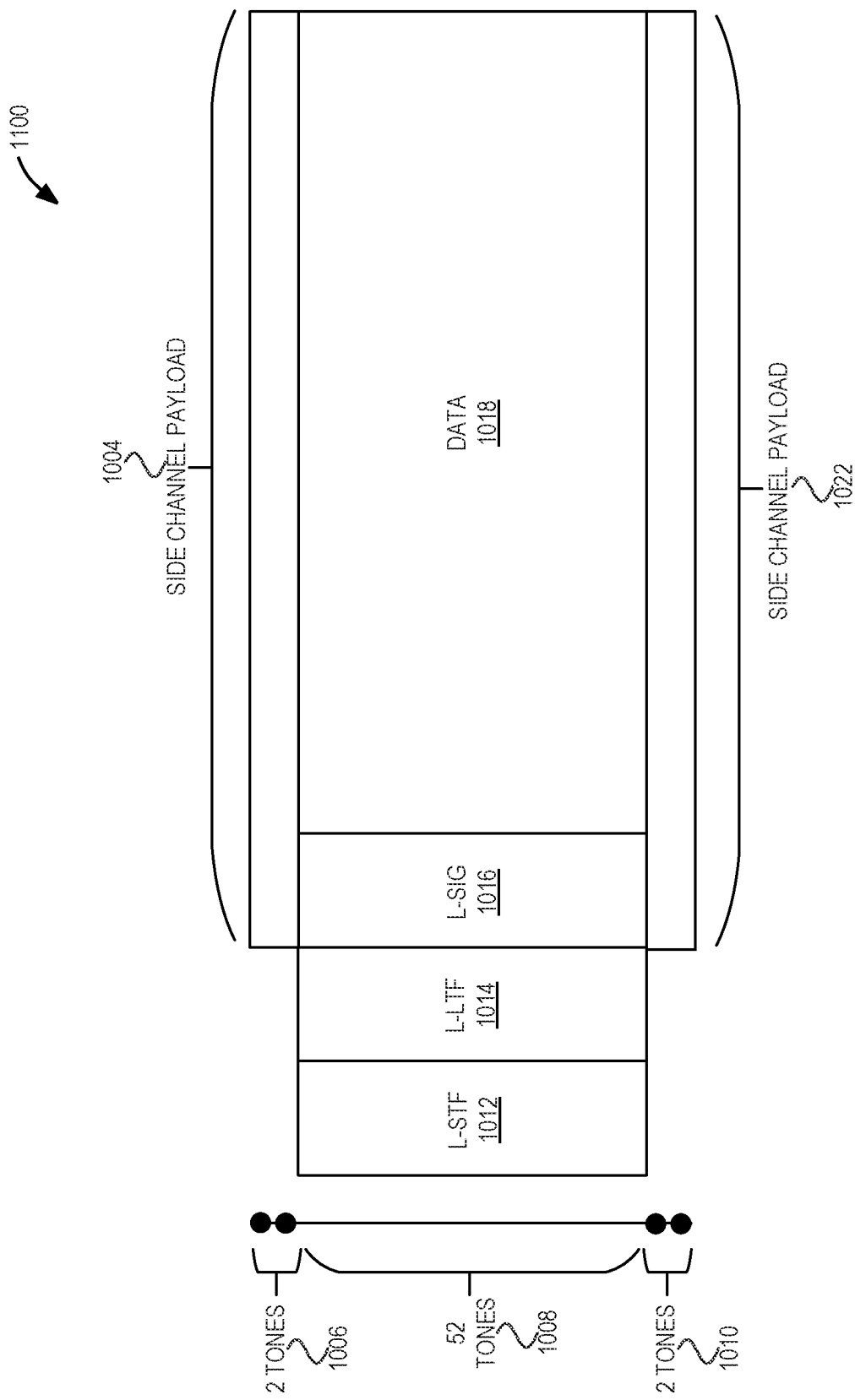
FIG. 11 illustrates a NGV packet, in accordance with some embodiments.

FIG. 10 illustrates a NGV packet 1000, in accordance with some embodiments. FIG. 11 illustrates a NGV packet 1100, in accordance with some embodiments. FIGS. 10 and 11 are disclosed in conjunction with one another. Illustrated in FIGS. 10 and 11 are side channel payload 1004, 1022, 2 tones 1006, 1010, 48 tones 1008, L-STF 1012, L-LTF 1014, L-SIG 1016, and data field 1018. Packet 1000 may include extra LTFs 1002, 1020. L-STF 1012 may be the same or similar as L-STF 904. L-LTF 1014 may be the same or similar as L-LTF 906. L-SIG 1016 may be the same or similar as 908. Data field 1018 may be the same or similar as data field 910. L-STF 1012, L-LTF 1014, L-SIG 1016, and data field 1018 are transmitted on 48 tones 1008, e.g., that is the number of tones that are used for transmission in a channel used for transmission, e.g., in a 10 MHz channel. Two (2) tones 1006, 1010 are guard tones that are not used for transmission in accordance with IEEE 802.11p. Legacy devices 506 decode NGV packet 1000 and do not decode two (2) tones 1006,1010 so that NGV packet 1000 is backward compatible with IEEE 802.11p. In some embodiments, only one of the two (2) tones 1006, 1010 is used for extra LTF 1002 and side channel payload 1004. The channel for a legacy transmission may be 10 MHz with 48 tones 1008 and two (2) tones 1006, 1010 on either side for guard tones.

Extra LTF 1002, 1020 may be signals that are used for training the IEEE 802.11ad wireless devices to decode the side channel payload 1004, 1022 (e.g., AP 502, stations 504, and/or RSU 508 are configured to use the extra LTF 1002, 1020 to train to decode side channel payload 1004, 1022). In some embodiments, the side channel payload 1004, 1022 is encoded on the two (2) tones 1006, 1010 through the length of the NGV packet 1000, e.g., to the end of the data field 1018. In some embodiments, the side channel payload 1004, 1022 does not extend to the end of the NGV packet 1000, e.g., the side channel payload 1004, 1022 may include a length field to indicate a length of the side channel payload 1004, 1022, or the length may be indicated in another way, e.g., a fixed predetermined number. The NGV packet 1000 may be a PPDU. In some embodiments, the NGV packet 1000 is termed a NGV legacy enhanced packet.

In some embodiments, one or more of the first symbols of the side channel payload 1004, 1022 are training symbols, e.g., used for equalization and other parameter estimation. The side channel payload 1004, 1022 may have start in a different place, e.g., there may be an extra L-STF (not illustrated) and extra-LTF 1002 that are used for training by a AP 502, station 504, and/or RSU 508. In another example, the side channel payload 1004, 1022 may start after the beginning of the data field 1018, e.g., a predetermined number of symbols after the data field 1018 begins. In some embodiments, a predetermined pattern may indicate the end of training symbols in the side channel payload 1004, 1022 and the beginning of actually data symbols.

In some embodiments, the side channel payload 1004, 1022 comprises parity bits for the packet 1000, e.g., for one or more of the L-SIG 1016, data field 1018, and/or another field of the packet 1000. In some embodiments, one tone is used on either side of the 52 tones 1008 for the side channel payload 1004, 1022, and/or training symbols (e.g., extra LTF 1002).

APs 502, stations 504, and/or RSUs 508 encode a PPDU comprising the packet 1000 (in some embodiments, the packet 1000 is a PPDU) using a waveform in accordance with IEEE 802.11p to encode a MPDU (e.g., the payload of the data field 1018 plus MAC headers of the data field 1018), and encode for transmission the waveform to include side channel payload 1004, 1022 and zero, one, or a plurality of fields L-STF 1012, L-LTF 1014, and/or L-SIG field comprising training symbols. The side channel payload 1004, 1022 may include parity bit information (e.g., of the data field 1018 and/or data payload) and, optionally, training symbols. If fields L-STF 1012, L-LTF 1014, and/or L-SIG field are included they contain training symbols, in accordance with some embodiments.

Legacy devices 506 receive the packet 1000 and decode it as if it is a packet 1000 in accordance with IEEE 802.11p without regard to the two (2) tones 1006, 1010, which the legacy devices 506 treat as guard tones and do not decode as data or training tones, in accordance with some embodiments.

APs 502, stations 504, and/or RSUs 508 decode a PPDU comprising the packet 1000 (in some embodiments, the packet 1000 is a PPDU) and use the information in the side channel payload 1004, 1022 to improve reception of the packet 1000, e.g., there may be an error correction and/or detection code that may be used to either correct data or determine to request retransmission of the data.

APs 502, stations 504, and/or RSUs 508 detect that there is a side channel, e.g., side channel payload field 1018 based on either patterns of the side channel payload field 1018 or training symbols (e.g., extra LTF 1002 or a symbol of the side channel payload 1004). In some embodiments, APs 502, stations 504, and/or RSUs 508 will be configured to assume that there is a side channel payload 1004, 1022. In some embodiments, APs 502, stations 504, and/or RSUs 508 will attempt to decode side channel payload 1004, 1022 for received packets 1000 and determine there is a side channel payload 1004, 1022 based on a successful decoding of the two (2) tones 1006, 1010.

The data portion of the (i.e., the portion not including training symbols) side channel payload 1004, 1022, may be encoded using the current convolutional encoder, a repetition code, or another method of encoding. The side channel payload 1004, 1022 may include parity information for both the data field 1018 and the side channel payload 1004, 1022.

In some embodiments, packet 1000 is encoded with an OFDM symbol covering the 48 tones 1008 plus two (2) tones 1006, 1010, so that the length of a code word would be 52 encoded symbols (or 50 in the case where only 1 tone is used on either side of the 48 tones 1008). The legacy devices 508 may not be able to decode the code word in this case but would defer based on decoding a length or duration in the L-SIG 1016. In some embodiments, two (2) tones 1006, 1010 is used to provide extra parity bits which are used as an outer code where the outer code is low density parity check code (LDPC) or a Turbo code. In these embodiments, the hardware may be reused for encoding.

In some embodiments, IEEE 802.11p MPDUs are between 100 to 300 bytes and are transmitted with a fixed MCS. Reliability enables the range of transmission to be increased. The lowest rate for IEEE 802.11p MPDUs is 6 Mbps. The main data payload for IEEE 802.11p MPDUs is 48 bits per OFDM symbol (8μ). So, 17 OFDM symbols for 100 bytes is needed, and 50 OFDM symbols for 300 bytes. If two (2) tones 1006, 1010 is two tones (or subcarriers), then 3 Mbps modulation can be used for the side channel payload 1004, 1022, which would mean 2 bits per OFDM symbol for the side channel payload 1004, 1022. 6 Mbps uses quadrature phase shift keying (QPSK) modulation with rate=1/2 coding, in accordance with some embodiments. In some embodiments, the side channel payload 1004, 1022 is encoded using QPSK, which may enable the reuse of hardware used to decode and encode the data field 1018.

In some embodiments, the side channel payload 1004, 1022 is encoded using rate=1/4 convolutional code and/or 4× repetition coding. A 3 Mbps data rate for the side channel payload 1004, 1022, would mean a data channel payload of 34 bits for 100 bytes of MDPU (e.g., data field 1018) or 100 bits for 300 bytes of MPDU, which is large enough for error detection codes and/or fields to indicate repetition information (e.g., as disclosed in conjunction with FIG. 12).

Figure 12:
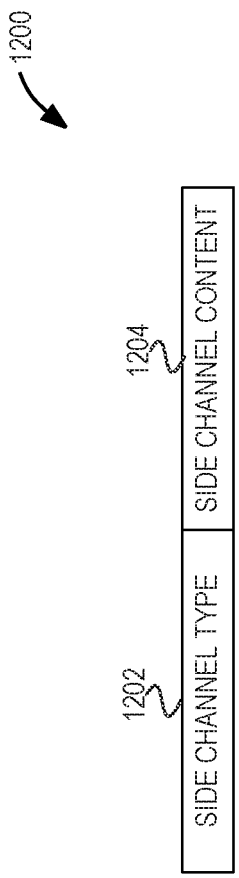
FIG. 12 illustrates fields, in accordance with some embodiments.

FIG. 12 illustrates fields 1200, in accordance with some embodiments. Illustrated in FIG. 12 is side channel type 1202 and side channel content 1204. Side channel type 1202 may be a field indicating the content of the side channel payload 1004, 1022. For example, a value of zero (0) may indicate that the side channel payload 1004, 1022 comprises parity bits. In another example, a value of one (1) may indicate that the side channel payload 1004, 1022 includes information for signaling information regarding repetitions. Fields 1200 are encoded in the side channel payload 1004, 1022, in accordance with some embodiments. In some embodiments, fields 1200 may be part of a communication standard (e.g., IEEE 802.11bd or NGV) or may be included in configuration information.

Figure 13:
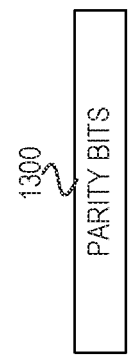
FIG. 13 illustrates parity bits, in accordance with some embodiments.

FIG. 13 illustrates parity bits 1300, in accordance with some embodiments. In some embodiments, if the side channel type 1202 indicates that the parity bits 1300 are present, then the parity bits 1300 field is present in the side channel payload 1004, 1022. In some embodiments, parity bits 1300 is included in the data field 1018.

Figure 14:
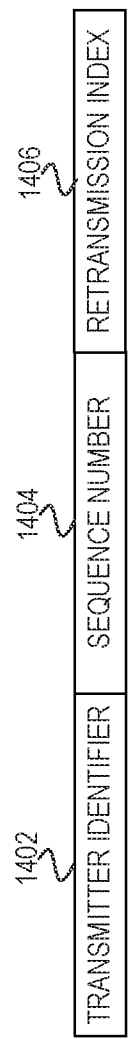
FIG. 14 illustrates extra parity type, in accordance with some embodiments.

FIG. 14 illustrates extra parity type 1400, in accordance with some embodiments. Illustrated in FIG. 14 is transmitter identifier 1402, sequence number 1404, and retransmission index 1406. In some embodiments, if the side channel type 1202 indicates extra parity type 1400, then extra parity type 1400 is present in the side channel payload 1004, 1022. In some embodiments, extra parity type 1400 is included in the data field 1018. Transmitter identifier 1402 may indicate a transmitter with a transmitter identifier, e.g., a MAC address of the transmitter or a hashing function of the MAC address of the transmitter. Sequence number 1404 is a sequence number to the transmitted MPDU (e.g., the packet 1000, 1100), in accordance with some embodiments. In some embodiments, sequence number 1404 is incremented for each new MPDU and is the same when an MPDU is transmitted multiple times. The retransmission index 1406 may begin at zero (0) when it is the first transmission of an MPDU and be incremented for each repletion of the MPDU. In some embodiments, a number of the repetitions to be transmitted is included in fields 1200 or extra parity type 1400.

In some embodiments, extra parity type 1400 includes a bit to indicate whether an additional retransmission is scheduled (e.g., a value of 1 for another repetition and a value of 0 to indicate no more repetitions.)

APs 502, stations 504, and/or RSUs 508 may be configured to encode and decode fields 1200, parity bits 1300, and/or extra parity type 1400 as disclosed herein. For example, extra parity type 1400 may decode a packet 1000, 1100, and determine that there are repetitions to be transmitted and store information regarding the received signals until a time out is reached or all the repetitions are accumulated.

In some embodiments, the methods, packets, PPDUs, and/or apparatuses disclosed in conjunction with FIGS. 8-15 may increase reliability (by providing error correction and/or detection information), reduce overhead (e.g., by not requiring the re-transmission of packets), and/or reduce buffer requirements (by providing information on which packets to save to use to accumulate.)

Figure 15:
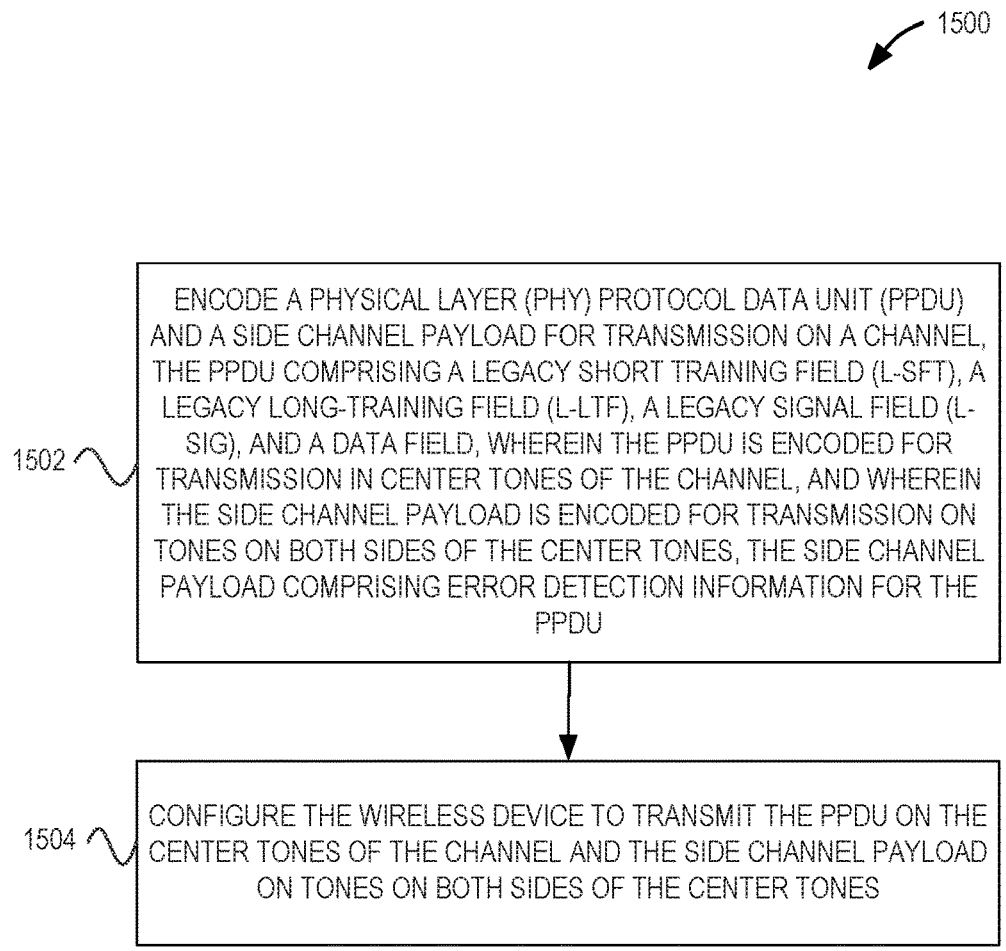
FIG. 15 illustrates a method for transmitting a packet with reliability information, in accordance with some embodiments.

FIG. 15 illustrates a method 1500 for transmitting a packet with reliability information, in accordance with some embodiments. The method 1500 begins at operation 1502 with encoding a PPDU and a side channel payload for transmission on a channel, the PPDU comprising a L-SFT, a L-LTF, a L-SIG, and a data field, wherein the PPDU is encoded for transmission in center tones of the channel, and wherein the side channel payload is encoded for transmission on tones on both sides of the center tones, the side channel payload comprising error detection information for the PPDU. For example, AP 502, station 504, and/or RSU 508 may encode packet 1000, 1100 to include a PPDU comprising L-STF 1012, L-LTF 1014, L-SIG 1016, and data 1018, and encode side channel payload 1004, 1022.

The method 1500 continues at operation 1504 with configuring the wireless device to transmit the PPDU on the center tones of the channel and the side channel payload on tones on both sides of the center tones. For example, an apparatus of AP 502, station 504, and/or RSU 508 may transmit the PPDU comprising L-STF 1012, L-LTF 1014, L-SIG 1016, and data 1018, and transmit side channel payload 1004, 1022. The method 1500 may include one or more additional operations.

The following examples pertain to further embodiments. Example 1 is an apparatus of a next generation vehicle to everything (V2X) (NGV) wireless device, the apparatus comprising memory; and processing circuitry coupled to the memory, the processing circuitry configured to: encode a physical layer (PHY) protocol data unit (PPDU) and a side channel payload for transmission on a channel, the PPDU comprising a legacy short training field (L-SFT), a legacy long-training field (L-LTF), a legacy signal field (L-SIG), and a data field, wherein the PPDU is encoded for transmission in center tones of the channel, and wherein the side channel payload is encoded for transmission on tones on both sides of the center tones, the side channel payload comprising error detection information for the PPDU; and configure the wireless device to transmit the PPDU on the center tones of the channel and the side channel payload on tones on both sides of the center tones.

In Example 2, the subject matter of Example 1 optionally includes where a number of center tones of the channel is 48 and a number of tones on both sides of the center tones is 2 tones per side. In Example 3, the subject matter of Examples 1 or 2 optionally includes where the error detection information for the PPDU comprises an error detection code for the data field. In Example 4, the subject matter of Examples 1-3 optionally includes where the error detection code is parity bits. In Example 5, the subject matter of Examples 1-4 optionally includes where error detection information for the PPDU comprises a side channel type and side channel content, wherein the side channel type indicates either that the side channel content is information regarding repetition of transmitting the PPDU or parity information.

In Example 6, the subject matter of Example 5 optionally includes where the PPDU is a first PPDU and the side channel payload is a first side channel payload, and when the side channel type indicates information regarding repetition of transmitting the first PPDU, the side channel content comprises the information regarding repetition of transmitting the first PPDU, the information regarding repetition of transmitting the first PPDU comprising a transmitter identifier of the wireless device, a sequence number, and a retransmission index, the sequence number indicating a sequence number of a media access control (MAC) protocol data unit (MPDU) comprising the data field, and the retransmission index indicating a transmission number of the first PPDU, and wherein the processing circuitry is further configured to: encode the number of the first PPDU to indicate one; encode a second PPDU to comprise the first PPDU; encode a second side channel payload to comprise side channel type indicating information regarding repetition of transmitting the first PPDU, the sequence number to indicate the sequence number of the MPDU, and the retransmission index to indicate 2; and configure the wireless device to transmit the second PPDU.

In Example 7, the subject matter of Examples 1-6 optionally includes where configure the wireless device to transmit the PPDU on the center tones of the channel and the side channel payload on tones on both sides of the center tones further comprises: configure the wireless device to transmit the PPDU on the center tones of the channel, the side channel payload on tones on both sides of the center tones, and before transmitting the side channel payload, one or more symbols of training symbols on the tones on both sides of the center tones.

In Example 8, the subject matter of Example 7 optionally includes where the one or more symbols of training symbols on the tones on both sides of the center tones is one symbol of training symbols transmitted simultaneously with the L-LFT. In Example 9, the subject matter of Examples 1-8 optionally includes where the channel is a 10 MHz channel in the 6 GHz band. In Example 10, the subject matter of Examples 1-9 optionally includes where the error detection information comprises an error detection and correction code of the data field.

In Example 11, the subject matter of Examples 1-10 optionally includes where the processing circuitry is further configured to: encode the data field in a media access control (MAC) protocol data unit (MPDU) and the MDPU in the PPDU, the MPDU comprising a sequence number. In Example 12, the subject matter of Examples 1-11 optionally includes where the processing circuitry comprises a field-programmable gate array (FPGA). In Example 13, the subject matter of Examples 1-10 optionally includes where the wireless device is configured to operate in accordance with one or more of the following communication standards: Institute of Electrical and Electronic Engineers (IEEE) 802.11p, IEEE 802.11 next generation vehicle to everything (V2X) (NGV), and IEEE 802.11.

Example 14 is an apparatus of a next generation vehicle (NGV) wireless device, the apparatus comprising memory; and processing circuitry coupled to the memory, the processing circuitry configured to: decode a physical layer (PHY) protocol data unit (PPDU) and a side channel payload from a channel, the PPDU comprising a legacy short training field (L-SFT), a legacy long-training field (L-LTF), a legacy signal field (L-SIG), and a data field, wherein the PPDU is decoded from center tones of the channel, and wherein the side channel payload is decoded from tones on both sides of the center tones, the side channel payload comprising error detection information for the PPDU; and determine whether the data field comprises errors based on the error detection information.

Figure 16:
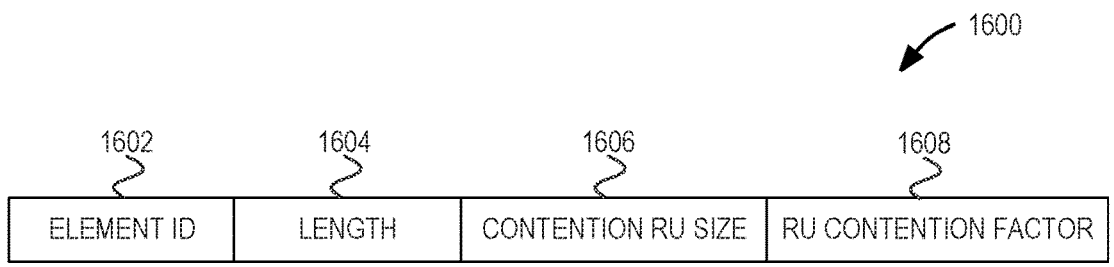
FIG. 16 illustrates an adaptive resource unit (RU) contention parameter element, in accordance with some embodiments.

FIG. 16 illustrates an adaptive resource unit (RU) contention parameter element 1600, in accordance with some embodiments. Illustrated in FIG. 16 is element identification (ID) 1602, length 1604, contention RU size 1606, and RU contention factor 1608. The element ID 1602 indicates an element ID, e.g., 7 as disclosed in conjunction with Table 1. The length 1604 indicates a length of adaptive RU contention parameter element 1600. Contention RU size 1606 indicates a size of the RUs (e.g., RU 1906 of FIG. 19). The RU contention factor 1608 indicates a threshold for determining whether a station 504 can access the wireless medium.

The adaptive RU contention parameter element 1600 may be broadcast by an RSU 508 and/or a lead vehicle (e.g., a station 504 that is a lead vehicle.) The adaptive RU contention parameter element 1600 may be included in a management frame (e.g., management frame 1910 of FIG. 19) such as a timing advertisement frame, which may be used to support dedicated short-range communications (DSRC). Table 1 illustrates timing advertisement frame body where adaptive RU contention parameters is added as existing element 7. The format is as disclosed in conjunction with FIG. 16. The row with "last" as the entry for order indicates that addition elements may be added.

TABLE 1

| Timing Advertisement frame body | | |
|---|---|---|
| Order | Information | Notes |
| Existing elements | | |
| 7 | Adaptive RU Contention Parameters | Optional. See format information below |
| Last | Vendor specific | One or more vendor specific information elements may appear in this frame. This information element follows all other information elements |

Figure 17:
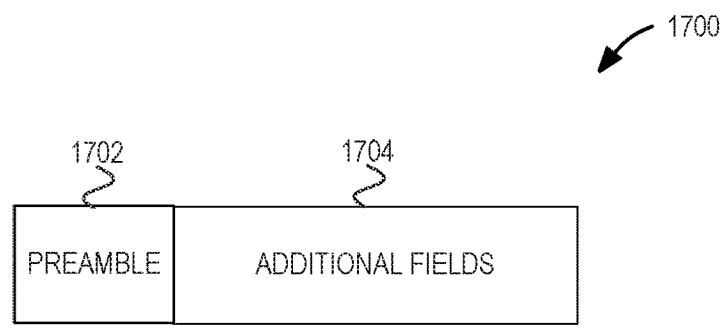
FIG. 17 indicates a synchronization (synch) frame, in accordance with some embodiments.

FIG. 17 indicates a synchronization (synch) frame 1700, in accordance with some embodiments. Illustrated in FIG. 17 is preamble 1702 and additional fields 1704. The preamble 1702 is used by APs 502, stations 504, and/or RSUs 508 for timing synchronization as described in conjunction with FIG. 19. Additional fields 1704 may be one or more additional fields.

Figure 18:
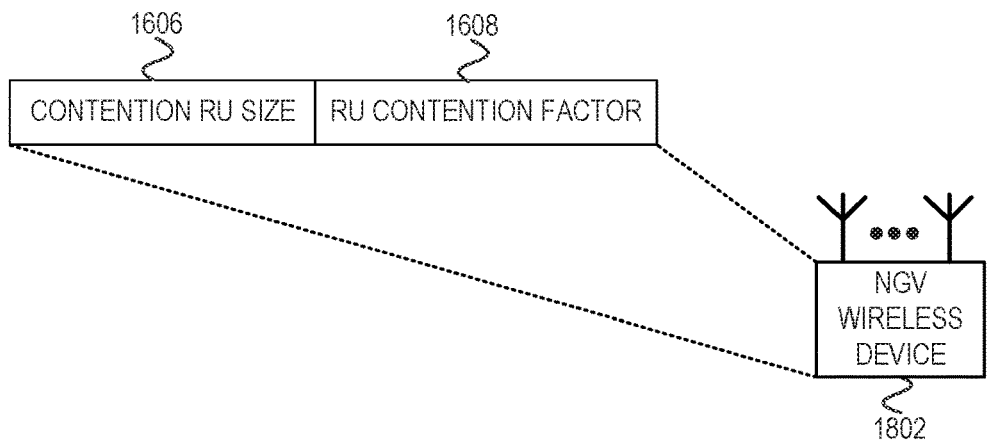
FIG. 18 illustrates NGV wireless device, in accordance with some embodiments.

FIG. 18 illustrates NGV wireless device 1802, in accordance with some embodiments. NGV wireless device 1802 may be an AP 502, station 504, and/or RSU 508. NGV wireless device 1802 may include contention RU size 1606 and RU contention factor 1608, which may be the same or similar as disclosed in conjunction with FIG. 16. The NGV wireless device 1802 may use the contention RU size 1606 and/or RU contention factor 1608 to determine access to a channel or RU.

Figure 19:
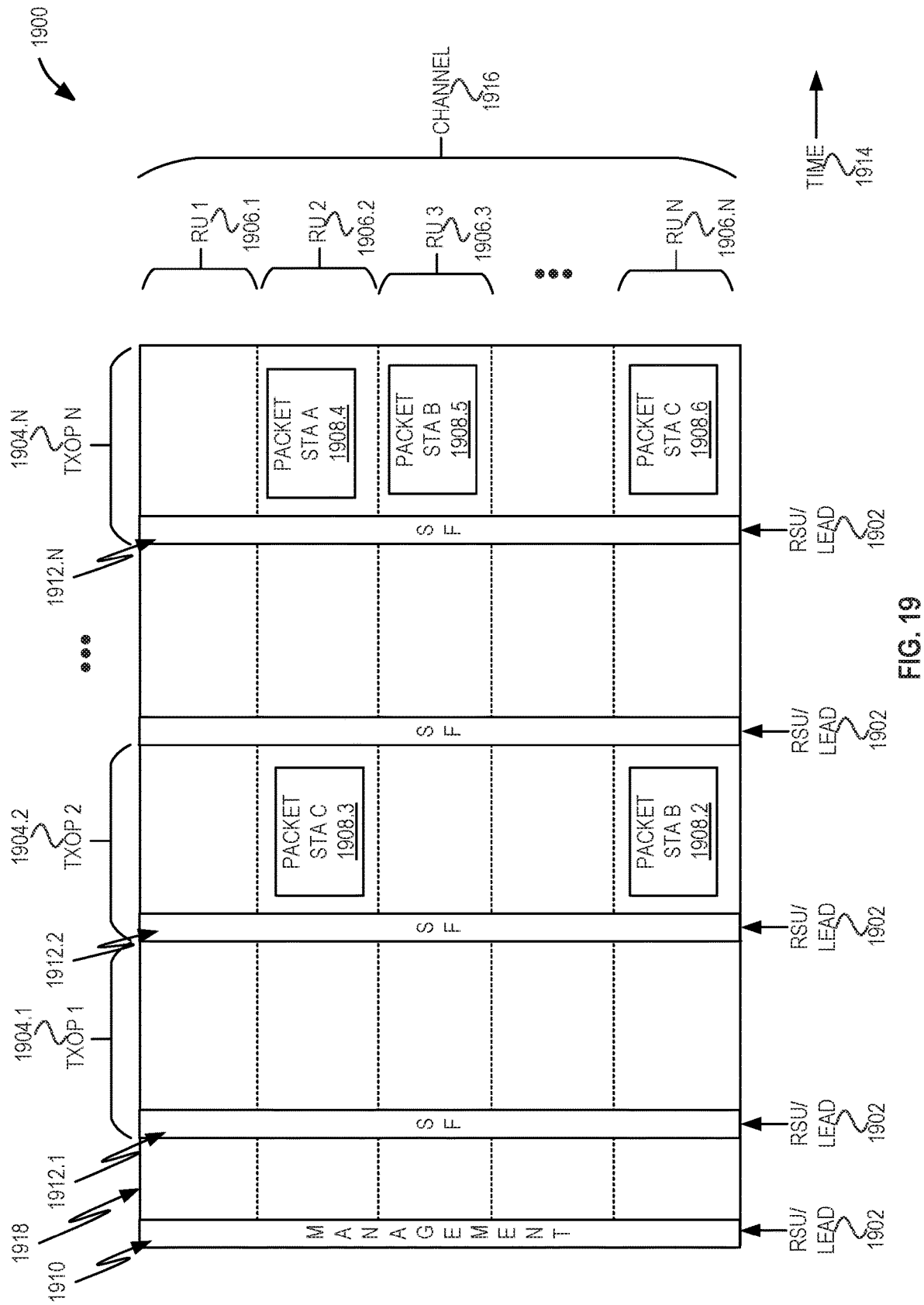
FIG. 19 illustrates a method of channelization of V2X networks, in accordance with some embodiments.

FIG. 19 illustrates a method 1900 of channelization of vehicle-to-everything (V2X) networks, in accordance with some embodiments. Illustrated in FIG. 19 is RSU/LEAD 1902, TXOPs 1904, RUs 1906, packets 1908, management frame 1910, short sequence frame (SF) 1912, time 1914, channel 1916, and initial period. The channel 1916 is a channel that is part of 5.850-5.925 GHz band in United States or 5.470 to 5.725 GHz band in Europe. The channel 1916 may be a defined channel of IEEE 802.11p or NGV, e.g., a 10 MHz or 20 MHz channel with a specific frequency range. The channel 1916 may be a dedicated channel for basic safety message communication among vehicles and between vehicles (e.g., stations 504) and RSUs 508. In some embodiments, the STAs and/or RSU/lead 1902 are configured to operate in accordance with DSRC. Time 1914 progresses from left to right. Time 1914 is split up into an initial period 1918 and transmission opportunities (TXOP) 1904.

The STA A, STA B, and STA C may be APs 502, stations 504, and/or RSUs 508. The STAs transmit in accordance with orthogonal frequency division multiple access (OFDMA) when transmitting on RUs 1906, in accordance with some embodiments. RSU/lead 1902 is an RSU 508, or an AP 502 or a station 504. A lead vehicle may be a vehicle in vehicle platooning that is taking the lead.

The method 1900 begins optionally with the RSU/lead 1902 determining to divide the channel 1916 into RUs 1906. The RSU/lead 1902 determines a contention RU size 1606 and a RU contention factor 1608, in accordance with some embodiments. The RUs 1906 may be 2 MHz, 4 MHz, 8 MHz, 10 MHz, 20 MHz, or another size that is either the same size as the channel 1916 (for one RU 1906) or a size that divides the channel 1916 into at least two RUs 1906. The channel 1916 can be divided into RUs 1906 of different size. The RSU/lead 1902 may choose RUs 1906 based on a congestion level with RUs being smaller for higher congestion levels. Additionally, in some embodiments, the RSU/lead 1902 determines a contention parameter, p. The contention parameter may be a floating-point number large than 0 but less than 1. APs 502, stations 504, and/or RSUs 508 generate a random number between 0 and 1 and compare the randomly generated number with p to determine whether to transmit or not, e.g., if the randomly generated number is higher than p, then the AP 502, station 504, and/or RSU 508 may determine to transmit. The RSU/lead 1902 may determine the management adaptive RU contention parameter element 1600 based on RU size and p, e.g., contention RU size 1606 (e.g., RU size) and RU contention factor 1608 (e.g., p). In some embodiments, contention RU size 1606 indicates a pattern of RUs, e.g., two 5 MHz channels, two 2.5 MHz channel and one 5 MHz channel, etc.

In some embodiments, the RSU/lead 1902 is configured to operate in accordance with IEEE 802.11ax (or EHT) and NGV. The RSU/lead 1902 may use time of the day and known traffic load patterns on different days to determine contention RU size 1606 and RU contention factor 1608. In some embodiments, RU contention factor 1608 is not part of management adaptive RU contention parameter element 1600 and is not used in method 1900. The RSU/lead 1902 may determine contention RU size 1606 and/or RU contention factor 1608 based on observing/listening to the channel 1916 and determining busy times in the channel 1916, estimated collisions (e.g., channel busy but no decodable message), etc. The RSU/lead 1902 may determine contention RU size 1606 and/or RU contention factor 1608 based on a vehicle density feed derived from traffic cameras or feed to RSU/lead 1902 via a network.

The method 1900 starts with an RSU/lead 1902 transmitting a broadcast management frame 1910 that includes some information regarding contention RU size 1606 and, optionally, RU contention factor 1608. For example, the management frame 1910 may include the management adaptive RU contention parameter element 1600. In some embodiments, the management frame 1902 is communicated to the STAs in a different way. The broadcast management frame 1910 may be timing advertisement frame. STA A, STA B, and STA C may decode the management frame 1910 and determine when TXOP 1 1904.1 begins.

The method 1900 continues with RSU/lead 1902 transmitting short synchronization frame (SF) 1912.1. In some embodiments, STA A, STA B, and STA C determine when TXOP 1 1904.1 begins based on receiving the SF 1912.1. The SF 1912 may be a synch frame 1700 as disclosed in conjunction with FIG. 17. The preamble 1702 includes synchronization information. STA A, STA B, and STA C may wait one or more TXOPs 1904 before transmitting. STA A, STA B, and STA C may determine when to transmit based on received signals that indicate whether RUs 1906 are busy or not. STA A, STA B, and STA B may determine a number of TXOP 1904 to observe before transmitting based on a predetermined parameter (e.g., 1, 2, or 3), a size of the RU 1906, or a parameter received from the RSU/lead 1902, e.g., adaptive RU contention parameter element 1600 may include another field.

The method 1900 continues with RSU/lead 1902 transmitting SF 1912.2. STA A, STA B, and STA C may observe the RUs 1906 until finding an RU 1906 that is determined to be not busy. STA A, STA B, and STA C may randomly select an available RU 1906 after determining which RUs 1906 are available (e.g., waiting one or more TXOPs 1904). STA A, STA B, and STA C may select a uniform distribution across available RUs 1906, in accordance with some embodiments. In some embodiments, STA A, STA B, and STA C determine a collision level potential for different RUs 1906 by observing (e.g., during a predetermined number of TXOPs 1904) a ratio of busy time vs. decodable messages from the RUs 1906. STA A, STA B, and STA C may generate a randomized parameter for a probability distribution across different RUs 1906. In some embodiments, the randomized parameter will increase the probability of selecting a less congested RU 1906 over a more congested RU 1906.

STA C transmits packet STA C 1908.3 on RU 1906.2 and STA B transmits packet STA B 1908.2 on RU N 1906.N. STA C may have determined that RUs 1906.1 and 1906.3 were busy and randomly selected RU 2 1906.2 from the remaining RUs 1906. STA B may have randomly selected RU N 1906.N from RUs 1906 that were not busy during the waiting period of TXOP 1 1904.1. In some embodiments, STAs each generate a random number and compare it with a value of RU contention factor 1608 and determine to transmit if the random number is greater than (or less than) the value of the RU contention factor 1608. For example, STA B and STA C may have determined that the random number was greater than the RU contention factor 1608 so they both transmitted, but STA A may have determined that the random number was less than the RU contention factor 1608 so STA A determined not to transmit. In some embodiments, packet STA A 1908.4, packet STA B 1908.2, 1908.5, and packet STA C 1908.3 may be PPDUs comprising basic safety message (BSM) with destination addressees set to a broadcast address.

In some embodiments, STA A, STA B, and STA C, generate a random number μ between 0 and 1 and If μ<ρ (value of RU contention factor 1608), the STA will transmit the message using the selected RU and choose it for future periodic safety messages; If μ≥ρ, the STA will refrain from transmitting the message in the current TXOP 1904 but listen if there is any other transmission (i.e. some other STA chose it), and randomly select another RU from available RUs 1906. And, repeat the same steps in the next TXOP 1904 until μ≥ρ on one of the available RUs 1906.

The method 1900 continues to RSU/lead 1902 transmitting SF 1912.N. The method 1900 continues with STA A transmitting packet STA A 1908.4, STA B transmitting packet STA B 1908.5, and STA C transmitting packet STA C 1908.6. STA A, STA B, and STA C may have selected the RUs 1906.2, 1906.3, and 1906.N, respectively, as disclosed herein.

In some embodiments, channel 1916 becomes congested without splitting up the channel 1916 or another channel into smaller divisions with RUs 1906. When channel 1916 becomes congested the performance of services may be restricted or ineffective. In some embodiments, splitting the channel 1916 into RUs 1906 lessens the congestion and enables more services to be provided.

In some embodiments, the RSU/lead 1902 is either not present or does not transmit the SFs 1912 and/or the management frame 1910. In some embodiments, traffic or transportation entities broadcast contention RU size 1606 and/or RU contention factor 1608 to vehicles (e.g., AP 502 and/or stations 504). In some embodiments, wide area communication links such as cellular networks transmit contention RU size 1606 and/or RU contention factor 1608 and the vehicles (e.g., AP 502 and/or stations 504) receive the transmission from cellular devices associated with the vehicles. In some embodiments, a software module between the cellular and the DSRC receiver might be implemented to exchange these parameters between the cellular network and the AP 502 and/or station 504.

In some embodiments, contention RU size 1606 and/or RU contention factor 1608 have values that can be determined without receiving the management frame 1910, e.g., the values may be standardized after determining suitable values for contention RU size 1606 and/or RU contention factor 1608. In some embodiments, the SF 1912 comprises an indication of the RUs 1906 (e.g., size and location of RUs 1906; a pattern of RUs 1906). In some embodiments, the SF 1912 is transmitted across the entire channel 1916. In some embodiments, the SF 1912 comprises a field with an indication of a pattern of RUs to use, e.g., 2.5 MHz, 2.5 MHz, 5 MHz, 10 MHz for a 20 MHz channel. In some embodiments, the RSU/lead 1902 will stop transmitting SFs 1912. In some embodiments, STA A, STA B, and STA C are configured to monitor the channel 1916 and determine there are RUs 1906 (a RU mode) based on decoding the SF 1904, which may include an indication of a RU size or RU pattern. In some embodiments, the RUs 1906 are part of a 10 MHz or 20 MHz subchannel of a group of channels that may be accessed by the RSU/lead 1902 and/or STA A, STA B, and STA C.

Figure 20:
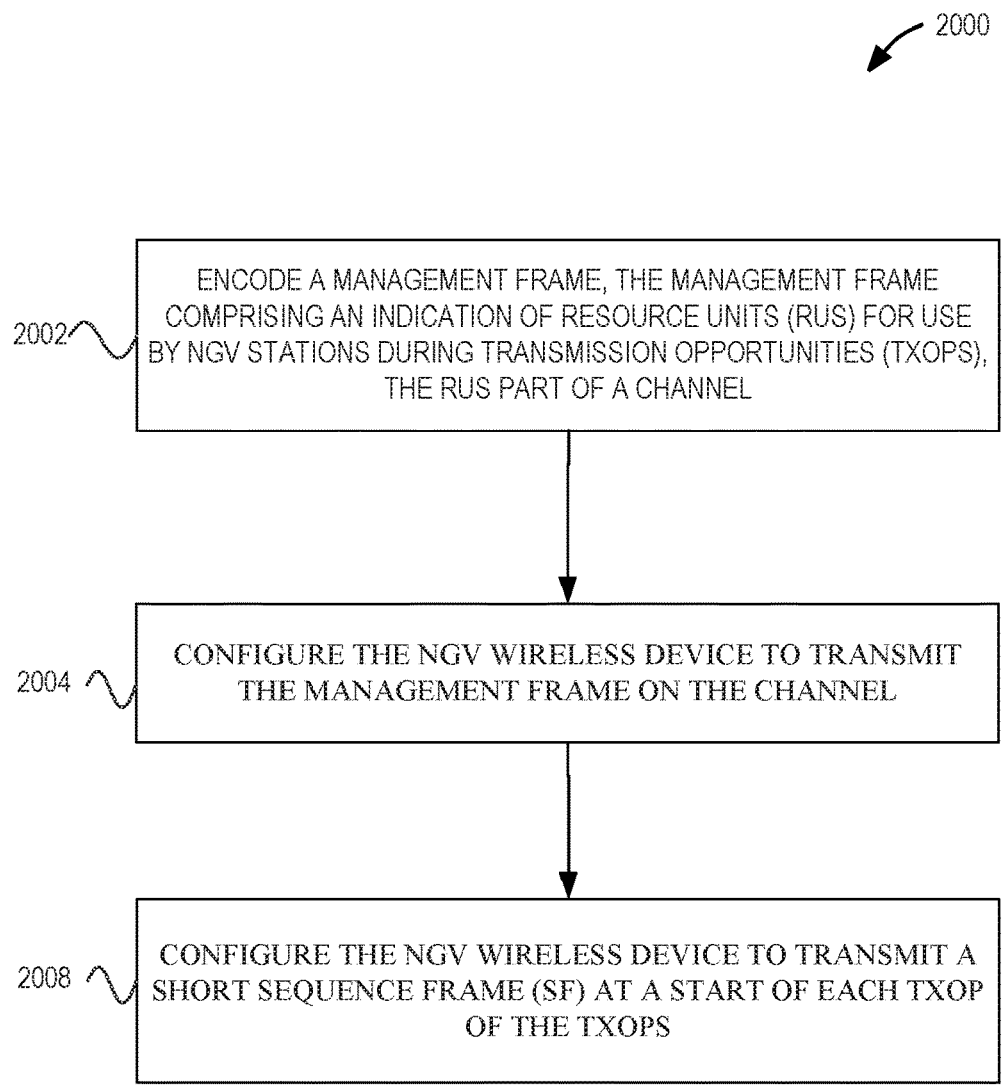
FIG. 20 illustrates a method of channelization of V2X networks, in accordance with some embodiments.

FIG. 20 illustrates a method 2000 of channelization of V2X networks, in accordance with some embodiments. The method 2000 begins at operation 2002 with encoding a management frame, the management frame comprising an indication of RUs for use by NGV stations during TXOPs, the RUs part of a channel. For example, RSU/lead 1902 transmits management frame 1910 as disclosed in conjunction with FIG. 19. STA A, STA B, and STA C are NGV stations and transmit during TXOPs 1904. In some embodiments, the management frame is not transmitted, and the stations determine to use the RUs based on a frame transmitted at the beginning of each TXOP, e.g., a SF that includes an indication of RU size or an RU pattern.

The method 2000 continues at operation 2004 with configuring the NGV wireless device to transmit the management frame on the channel. For example, an apparatus of RSU/lead 1902 may configure RSU/lead 1902 to transmit the management frame 1910. The method 2000 continues at operation 2006 with configuring the NGV wireless device to transmit a SF at a start of each TXOP of the TXOPs. For example, referring to FIG. 19, an apparatus of RSU/lead 1902 configures RSU/lead 1902 to transmit SF 1912 at the start of each TXOP 1904, e.g., SF 1912.2 at the start of TXOP 1904.2.

One or more of the operations of method 2000 may be optional. The operations may be performed in a different order. One or more additional operations may be performed as part of method 2000. Method 2000 may be performed by an apparatus of an AP 502, station 504, RSU 508, and/or a NGV wireless device.

Figure 21:
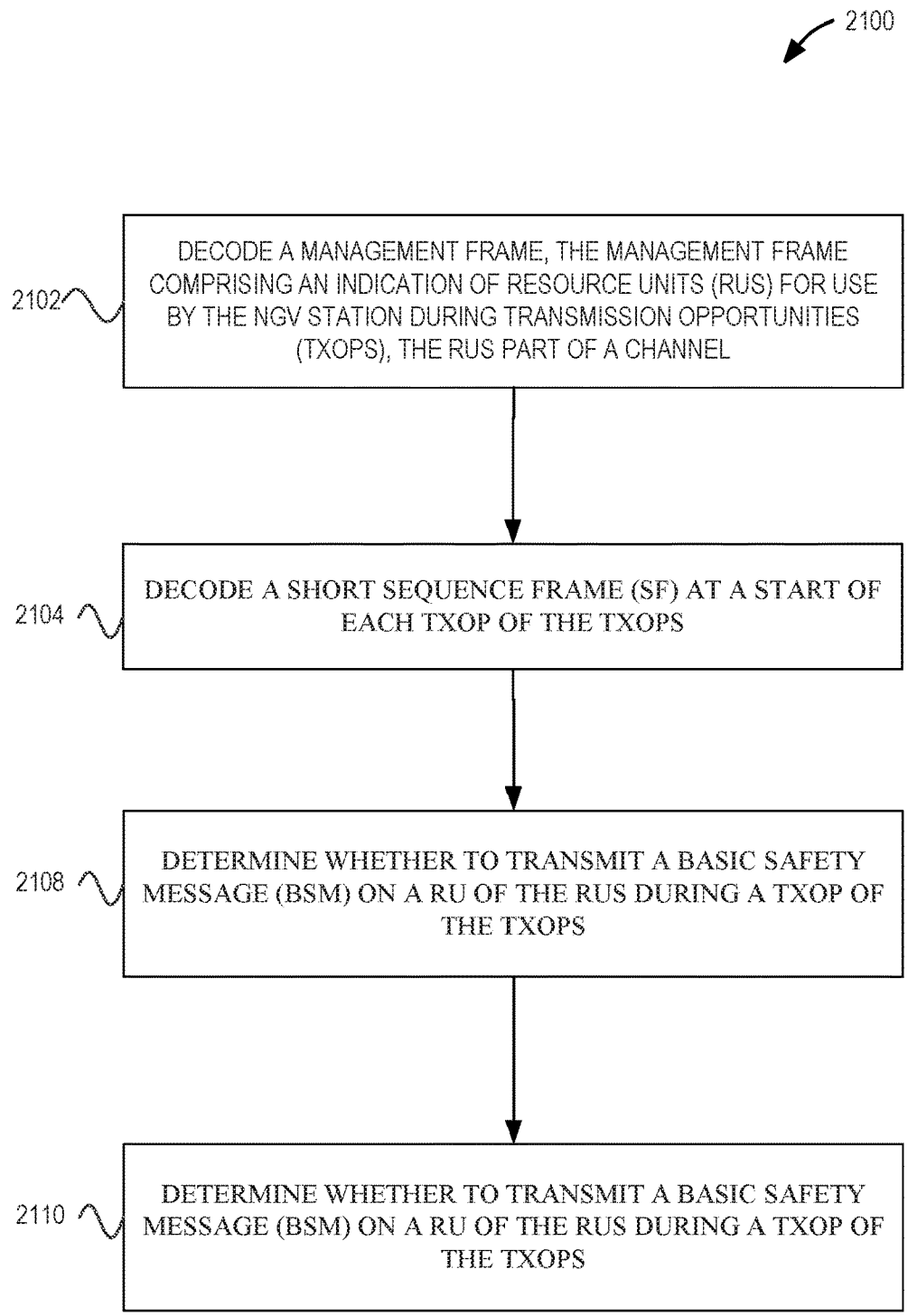
FIG. 21 illustrates a method of channelization of V2X networks, in accordance with some embodiments.

FIG. 21 illustrates a method 2100 of channelization of V2X networks, in accordance with some embodiments. The method 2100 begins at operation 2102 with decoding a management frame, the management frame including an indication of RUs for use by a NGV station during TXOPs where the RUs part of a channel. For example, referring to FIG. 19, STA A, STAB, and STA C decode management frame 1910 transmitted by RSU/lead 1902. The management frame 1910 includes an indication of the RUs 1906. STA A, STA B, and STA C are NGV stations and transmit on the RUs 1906 during TXOPs 1904.

The method 2100 continues at operation 2104 with decoding a SF at a start of each TXOP of the TXOPs. For example, STA A, STA B, and STA C decode SF 1912 at the start of each TXOP 1904. The method 2100 continues at operation 2106 with determining whether to transmit a BSM on a RU of the RUs during a TXOP of the TXOPs. For example, as disclosed herein and in conjunction with FIG. 19, STA A, STA B, and STA C determine whether or not to transmit packet STA A 1908.4, packet STA B 1908.2, and packet STA C 1908.3, respectively.

The method 2100 continues at operation 2108 with in response to a determination to transmit the BSM on the RU, encoding the BSM to comprise a safety information and a broadcast address, and configure the NGV station to transmit the BSM on the RU after receiving a corresponding SF during the TXOP. For example, STA A, STA B, and STA C encode and transmit packet STA A 1908.4, packet STA B 1908.2, and packet STA C 1908.3, respectively.

One or more of the operations of method 2100 may be optional. The operations may be performed in a different order. One or more additional operations may be performed as part of method 2100. Method 2100 may be performed by an apparatus of an AP 502, station 504, RSU 508, and/or a NGV wireless device.

Example 1 is an apparatus of a next generation vehicle to everything (V2X) (NGV) wireless device, the apparatus comprising memory; and processing circuitry coupled to the memory, the processing circuitry configured to: encode a management frame, the management frame comprising an indication of resource units (RUs) for use by NGV stations during transmission opportunities (TXOPs), the RUs part of a channel; configure the NGV wireless device to transmit the management frame on the channel; and configure the NGV wireless device to transmit a short sequence frame (SF) at a start of each TXOP of the TXOPs.

In Example 2, the subject matter of Example 1 includes, wherein the processing circuitry is further configured to: encode a new SF for each TXOP to be transmitted as the SF. In Example 3, the subject matter of Example 2 includes, wherein the SF comprises a preamble with synchronization signals to be used by the NGV stations to determine the start of each TXOP of the TXOPs. In Example 4, the subject matter of Examples 1-3 includes, MHz channel, and wherein the RUs are less than or equal to one half of the channel.

In Example 5, the subject matter of Examples 1-4 includes, wherein the processing circuitry is further configured to: encode the management frame to comprise an indication of a RU contention factor, the RU contention factor to be used by the NGV stations to determine whether to access an RU of the RUs.

In Example 6, the subject matter of Example 5 includes, wherein the RU contention factor indicates a probability that a NGV station is permitted to access a RU of the RUs during one TXOP of the TXOPs.

In Example 7, the subject matter of Example 6 includes, wherein the processing circuitry is further configured to: determine a congestion level of the channel based on received signals from the channel; and determine a value of the RU contention factor based on the congestion level of the channel.

In Example 8, the subject matter of Examples 1-7 includes, wherein the processing circuitry is further configured to: determine a congestion level of the channel based on received signals from the channel, the received signal comprising signals from the stations in accordance with orthogonal frequency division multiple access (OFDMA); and select the RUs based on the congestion level, wherein smaller RUs are selected for a higher congestion level.

In Example 9, the subject matter of Examples 1-8 includes, wherein the management frame configures the NGV stations to transmit basic safety messages (BSMs) within one of the RUs, the BSMs comprising a broadcast address.

In Example 10, the subject matter of Examples 1-9 includes, wherein configure the NGV wireless device to transmit the SF at the start of each TXOP of the TXOPs further comprises: configure the NGV wireless device to transmit the SF on the channel at the start of each TXOP of the TXOPs.

In Example 11, the subject matter of Example 10 includes, wherein the SF comprises the indication of the RUs for use by the NGV stations during the TXOP. In Example 12, the subject matter of Examples 1-11 includes, wherein the management frame is a first management frame, and wherein the processing circuitry is further configured to: determine a congestion level of the channel based on received signals from the channel; in response to the congestion level being different by a predetermined threshold than a previously determined congestion level, determine new RUs for use by the NGV stations, encode a second management frame to comprise an indication of the new RUs, and configure the NGV wireless device to transmit the second management frame on the channel.

In Example 13, the subject matter of Examples 1-12 includes, wherein the processing circuitry is further configured to: receive the indication of the RUs for use by NGV stations during TXOPs from a management entity.

In Example 14, the subject matter of Examples 1-13 includes, NGV.

In Example 15, the subject matter of Examples 1-14 includes, wherein the processing circuitry comprises a field-programmable gate array (FPGA). In Example 16, the subject matter of Examples 1-15 includes, wherein the processing circuitry comprises one or more application specific integrated circuits (ASICs).

Example 17 is a non-transitory computer-readable storage medium that stores instructions for execution by one or more processors of a next generation vehicle to everything (V2X) (NGV) wireless device, the instructions to configure the one or more processors to: encode a management frame, the management frame comprising an indication of resource units (RUs) for use by NGV stations during transmission opportunities (TXOPs), the RUs part of a channel; configure the NGV wireless device to transmit the management frame on the channel; and configure the NGV wireless device to transmit a short sequence frame (SF) at a start of each TXOP of the TXOPs.

In Example 18, the subject matter of Example 17 includes, wherein the instructions further configured the one or more processors to: encode a new SF for each TXOP to be transmitted as the SF. In Example 19, the subject matter of Examples 17-18 includes, wherein the instructions further configure the one or more processors to: encode a new SF for each TXOP to be transmitted as the SF. In Example 20, the subject matter of Example 19 includes, wherein the SF comprises a preamble with synchronization signals to be used by the NGV stations to determine the start of each TXOP of the TXOPs.

In Example 21, the subject matter of Examples 17-20 includes, MHz channel, and wherein the RUs are less than or equal to one half of the channel. In Example 22, the subject matter of Examples 17-21 includes, wherein the instructions further configured the one or more processors to: encode the management frame to comprise an indication of a RU contention factor, the RU contention factor to be used by the NGV stations to determine whether to access an RU of the RUs.

In Example 23, the subject matter of Example 22 includes, wherein the RU contention factor indicates a probability that a NGV station is permitted to access a RU of the RUs during one TXOP of the TXOPs. In Example 24, the subject matter of Example 23 includes, wherein the instructions further configured the one or more processors to: determine a congestion level of the channel based on received signals from the channel; and determine a value of the RU contention factor based on the congestion level of the channel.

In Example 25, the subject matter of Examples 17-24 includes, wherein the instructions further configured the one or more processors to: determine a congestion level of the channel based on received signals from the channel, the received signal comprising signals from the stations in accordance with orthogonal frequency division multiple access (OFDMA); and select the RUs based on the congestion level, wherein smaller RUs are selected for a higher congestion level.

In Example 26, the subject matter of Examples 17-25 includes, wherein the management frame configures the NGV stations to transmit basic safety messages (BSMs) within one of the RUs, the BSMs comprising a broadcast address. In Example 27, the subject matter of Examples 17-26 includes, wherein configure the NGV wireless device to transmit the SF at the start of each TXOP of the TXOPs further comprises: configure the NGV wireless device to transmit the SF on the channel at the start of each TXOP of the TXOPs.

In Example 28, the subject matter of Example 27 includes, wherein the SF comprises the indication of the RUs for use by the NGV stations during the TXOP. In Example 29, the subject matter of Examples 17-28 includes, wherein the management frame is a first management frame, and wherein the instructions further configured the one or more processors to: determine a congestion level of the channel based on received signals from the channel; in response to the congestion level being different by a predetermined threshold than a previously determined congestion level, determine new RUs for use by the NGV stations, encode a second management frame to comprise an indication of the new RUs, and configure the NGV wireless device to transmit the second management frame on the channel.

In Example 30, the subject matter of Examples 17-29 includes, wherein the instructions further configured the one or more processors to: receive the indication of the RUs for use by NGV stations during TXOPs from a management entity. In Example 31, the subject matter of Examples 17-30 includes, NGV. Example 32 is an apparatus of a next generation vehicle to everything (V2X) (NGV) station, the apparatus comprising memory; and processing circuitry coupled to the memory, the processing circuitry configured to: decode a management frame, the management frame comprising an indication of resource units (RUs) for use by the NGV station during transmission opportunities (TXOPs), the RUs part of a channel; decode a short sequence frame (SF) at a start of each TXOP of the TXOPs; determine whether to transmit a basic safety message (BSM) on a RU of the RUs during a TXOP of the TXOPs; and in response to a determination to transmit the BSM on the RU, encode the BSM to comprise a safety information and a broadcast address, and configure the NGV station to transmit the BSM on the RU after receiving a corresponding SF during the TXOP.

In Example 33, the subject matter of Example 32 includes, wherein determine whether to transmit the BSM on the RU of the RUs during the TXOP of the TXOPs comprises: receiving signals from the RU; and determining not to transmit on the RU if the received signals indicate the RU is busy.

Example 34 is a method performed by an apparatus of a next generation vehicle to everything (V2X) (NGV) wireless device, the method comprising: encoding a management frame, the management frame comprising an indication of resource units (RUs) for use by NGV stations during transmission opportunities (TXOPs), the RUs part of a channel; configuring the NGV wireless device to transmit the management frame on the channel; and configuring the NGV wireless device to transmit a short sequence frame (SF) at a start of each TXOP of the TXOPs.

In Example 35, the subject matter of Example 34 includes, the method further comprising: encoding a new SF for each TXOP to be transmitted as the SF. In Example 36, the subject matter of Example 35 includes, wherein the SF comprises a preamble with synchronization signals to be used by the NGV stations to determine the start of each TXOP of the TXOPs. In Example 37, the subject matter of Examples 34-36 includes, MHz channel, and wherein the RUs are less than or equal to one half of the channel. In Example 38, the subject matter of Examples 35-37 includes, the method further comprising: encode the management frame to comprise an indication of a RU contention factor, the RU contention factor to be used by the NGV stations to determine whether to access an RU of the RUs.

In Example 39, the subject matter of Example 38 includes, wherein the RU contention factor indicates a probability that a NGV station is permitted to access a RU of the RUs during one TXOP of the TXOPs. In Example 40, the subject matter of Example 39 includes, the method further comprising: determining a congestion level of the channel based on received signals from the channel; and determining a value of the RU contention factor based on the congestion level of the channel.

In Example 41, the subject matter of Examples 34-40 includes, the method further comprising: determining a congestion level of the channel based on received signals from the channel, the received signal comprising signals from the stations in accordance with orthogonal frequency division multiple access (OFDMA); and selecting the RUs based on the congestion level, wherein smaller RUs are selected for a higher congestion level.

In Example 42, the subject matter of Examples 34-41 includes, wherein the management frame configures the NGV stations to transmit basic safety messages (BSMs) within one of the RUs, the BSMs comprising a broadcast address.

In Example 43, the subject matter of Examples 34-42 includes, wherein configure the NGV wireless device to transmit the SF at the start of each TXOP of the TXOPs further comprises: configuring the NGV wireless device to transmit the SF on the channel at the start of each TXOP of the TXOPs.

In Example 44, the subject matter of Example 43 includes, wherein the SF comprises the indication of the RUs for use by the NGV stations during the TXOP. In Example 45, the subject matter of Examples 43-44 includes, wherein the management frame is a first management frame, and wherein the method further comprises: determining a congestion level of the channel based on received signals from the channel; in response to the congestion level being different by a predetermined threshold than a previously determined congestion level, determining new RUs for use by the NGV stations, encoding a second management frame to comprise an indication of the new RUs, and configuring the NGV wireless device to transmit the second management frame on the channel.

In Example 46, the subject matter of Examples 34-45 includes, wherein the method further comprises: receiving the indication of the RUs for use by NGV stations during TXOPs from a management entity.

In Example 47, the subject matter of Examples 34-46 includes, NGV. Example 48 is an apparatus of a next generation vehicle to everything (V2X) (NGV) wireless device, the apparatus comprising: means for encoding a management frame, the management frame comprising an indication of resource units (RUs) for use by NGV stations during transmission opportunities (TXOPs), the RUs part of a channel; means for configuring the NGV wireless device to transmit the management frame on the channel; and means for configuring the NGV wireless device to transmit a short sequence frame (SF) at a start of each TXOP of the TXOPs.

In Example 49, the subject matter of Example 48 includes, the apparatus further comprising: means for encoding a new SF for each TXOP to be transmitted as the SF. In Example 50, the subject matter of Example 49 includes, wherein the SF comprises a preamble with synchronization signals to be used by the NGV stations to determine the start of each TXOP of the TXOPs.

In Example 51, the subject matter of Examples 48-50 includes, MHz channel, and wherein the RUs are less than or equal to one half of the channel. In Example 52, the subject matter of Examples 48-51 includes, the apparatus further comprising: means for encoding the management frame to comprise an indication of a RU contention factor, the RU contention factor to be used by the NGV stations to determine whether to access an RU of the RUs.

In Example 53, the subject matter of Example 52 includes, wherein the RU contention factor indicates a probability that a NGV station is permitted to access a RU of the RUs during one TXOP of the TXOPs. In Example 54, the subject matter of Example 53 includes, the apparatus further comprising: means for determining a congestion level of the channel based on received signals from the channel; and means for determining a value of the RU contention factor based on the congestion level of the channel. In Example 55, the subject matter of Examples 53-54 includes, the apparatus further comprising: means for determining a congestion level of the channel based on received signals from the channel, the received signal comprising signals from the stations in accordance with orthogonal frequency division multiple access (OFDMA); and means for selecting the RUs based on the congestion level, wherein smaller RUs are selected for a higher congestion level.

In Example 56, the subject matter of Examples 48-55 includes, wherein the management frame configures the NGV stations to transmit basic safety messages (BSMs) within one of the RUs, the BSMs comprising a broadcast address.

In Example 57, the subject matter of Examples 48-56 includes, wherein configure the NGV wireless device to transmit the SF at the start of each TXOP of the TXOPs further comprises: means for configuring the NGV wireless device to transmit the SF on the channel at the start of each TXOP of the TXOPs.

In Example 58, the subject matter of Examples 48-57 includes, wherein the SF comprises the indication of the RUs for use by the NGV stations during the TXOP. In Example 59, the subject matter of Examples 48-58 includes, wherein the management frame is a first management frame, and wherein the apparatus further comprises: means for determining a congestion level of the channel based on received signals from the channel; in response to the congestion level being different by a predetermined threshold than a previously determined congestion level, means for determining new RUs for use by the NGV stations, means for encoding a second management frame to comprise an indication of the new RUs, and means for configuring the NGV wireless device to transmit the second management frame on the channel.

In Example 60, the subject matter of Examples 48-59 includes, wherein the apparatus further comprises: means for receiving the indication of the RUs for use by NGV stations during TXOPs from a management entity. In Example 61, the subject matter of Examples 48-60 includes, NGV. In Example 62, the subject matter of Examples 48-61 includes, wherein the processing circuitry comprises means for a field-programmable gate array (FPGA).

In Example 63, the subject matter of Examples 48-62 includes, wherein the processing circuitry comprises means for one or more application specific integrated circuits (ASICs). Example 64 is at least one machine-readable medium including instructions that, when executed by processing circuitry, cause the processing circuitry to perform operations to implement of any of Examples 1-63. Example 65 is an apparatus comprising means to implement of any of Examples 1-63. Example 66 is a system to implement of any of Examples 1-63. Example 67 is a method to implement of any of Examples 1-63.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a next generation vehicle to everything (V2X) (NGV) wireless device, the apparatus comprising memory; and processing circuitry coupled to the memory, the processing circuitry configured to:
    encode a management frame, the management frame comprising an indication of resource units (RUs) for use by NGV stations during transmission opportunities (TXOPs), the RUs part of a channel;
    configure the NGV wireless device to transmit the management frame on the channel; and
    configure the NGV wireless device to transmit a short sequence frame (SF) at a start of each TXOP of the TXOPs.

2. The apparatus of claim 1, wherein the processing circuitry is further configured to:
    encode a new SF for each TXOP to be transmitted as the SF.

3. The apparatus of claim 2, wherein the SF comprises a preamble with synchronization signals to be used by the NGV stations to determine the start of each TXOP of the TXOPs.

4. The apparatus of claim 1, wherein the channel is a 10 MHz channel or a 20 MHz channel, and wherein the RUs are less than or equal to one half of the channel.

5. The apparatus of claim 1, wherein the processing circuitry is further configured to:
    encode the management frame to comprise an indication of a RU contention factor, the RU contention factor to be used by the NGV stations to determine whether to access an RU of the RUs.

6. The apparatus of claim 5, wherein the RU contention factor indicates a probability that a NGV station is permitted to access a RU of the RUs during one TXOP of the TXOPs.

7. The apparatus of claim 6, wherein the processing circuitry is further configured to:
    determine a congestion level of the channel based on received signals from the channel; and
    determine a value of the RU contention factor based on the congestion level of the channel.

8. The apparatus of claim 1, wherein the processing circuitry is further configured to:
    determine a congestion level of the channel based on received signals from the channel, the received signal comprising signals from the stations in accordance with orthogonal frequency division multiple access (OFDMA); and select the RUs based on the congestion level, wherein smaller RUs are selected for a higher congestion level.

9. The apparatus of claim 1, wherein the management frame configures the NGV stations to transmit basic safety messages (BSMs) within one of the RUs, the BSMs comprising a broadcast address.

10. The apparatus of claim 1, wherein configure the NGV wireless device to transmit the SF at the start of each TXOP of the TXOPs further comprises:

configure the NGV wireless device to transmit the SF on the channel at the start of each TXOP of the TXOPs.

11. The apparatus of claim 10, wherein the SF comprises the indication of the RUs for use by the NGV stations during the TXOP.

12. The apparatus of claim 1, wherein the management frame is a first management frame, and wherein the processing circuitry is further configured to:

determine a congestion level of the channel based on received signals from the channel;

in response to the congestion level being different by a predetermined threshold than a previously determined congestion level, determine new RUs for use by the NGV stations, encode a second management frame to comprise an indication of the new RUs, and configure the NGV wireless device to transmit the second management frame on the channel.

13. The apparatus of claim 1, wherein the processing circuitry is further configured to:

receive the indication of the RUs for use by NGV stations during TXOPs from a management entity.

14. The apparatus of claim 1, wherein the NGV wireless device is a roadside unit or a lead NGV station and wherein the stations are configured to operate in accordance with Institute of Electronic and Electrical Engineers (IEEE) 802.11bd.

15. The apparatus of claim 1, wherein the processing circuitry comprises a field-programmable gate array (FPGA).

16. The apparatus of claim 1, wherein the processing circuitry comprises one or more application specific integrated circuits (ASICs).

17. A non-transitory computer-readable storage medium that stores instructions for execution by one or more processors of a next generation vehicle to everything (V2X) (NGV) wireless device, the instructions to configure the one or more processors to:

encode a management frame, the management frame comprising an indication of resource units (RUs) for use by NGV stations during transmission opportunities (TXOPs), the RUs part of a channel;

configure the NGV wireless device to transmit the management frame on the channel; and configure the NGV wireless device to transmit a short sequence frame (SF) at a start of each TXOP of the TXOPs.

18. The non-transitory computer-readable storage medium of claim 17, wherein the instructions further configured the one or more processors to:

encode a new SF for each TXOP to be transmitted as the SF.

19. An apparatus of a next generation vehicle to everything (V2X) (NGV) station, the apparatus comprising memory; and processing circuitry coupled to the memory, the processing circuitry configured to:

decode a management frame, the management frame comprising an indication of resource units (RUs) for use by the NGV station during transmission opportunities (TXOPs), the RUs part of a channel;

decode a short sequence frame (SF) at a start of each TXOP of the TXOPs;

determine whether to transmit a basic safety message (BSM) on a RU of the RUs during a TXOP of the TXOPs; and in response to a determination to transmit the BSM on the RU, encode the BSM to comprise a safety information and a broadcast address, and configure the NGV station to transmit the BSM on the RU after receiving a corresponding SF during the TXOP.

20. The apparatus of claim 1, wherein determine whether to transmit the BSM on the RU of the RUs during the TXOP of the TXOPs comprises:

receiving signals from the RU; and determining not to transmit on the RU if the received signals indicate the RU is busy.

* * * * *